United States Patent [19]

Valenti

[11] Patent Number: 4,974,149
[45] Date of Patent: Nov. 27, 1990

[54] DATA DISTRIBUTION APPARATUS AND METHOD HAVING A DATA DESCRIPTION INCLUDING INFORMATION FOR SPECIFYING A TIME THAT A DATA DISTRIBUTION IS TO OCCUR

[75] Inventor: Andrew P. Valenti, Concord, Mass.

[73] Assignee: Wang Laboratories, Inc., Lowell, Mass.

[21] Appl. No.: 497,757

[22] Filed: Mar. 20, 1990

Related U.S. Application Data

[63] Continuation of Ser. No. 762,098, Aug. 2, 1985, abandoned.

[51] Int. Cl.$^5$ .................. G06F 12/00; G06F 13/00; G06F 13/10; G06F 13/12
[52] U.S. Cl. .................. 364/200; 364/222.81; 364/222.82; 364/241.7; 364/242.94; 364/270; 364/270.1; 364/284; 364/284.3; 364/284.4
[58] Field of Search .................. 364/700, 900; 370/50, 370/51, 84, 85.1

[56] References Cited

U.S. PATENT DOCUMENTS

| | | | |
|---|---|---|---|
| 4,032,899 | 6/1977 | Jenny et al. | 364/200 |
| 4,477,880 | 10/1984 | Advani et al. | 364/900 |
| 4,498,142 | 2/1985 | Advani et al. | 364/900 |
| 4,523,206 | 6/1985 | Sasscer | 364/200 |
| 4,523,275 | 6/1985 | Swenson et al. | 364/200 |
| 4,558,413 | 12/1985 | Schmidt et al. | 364/300 |
| 4,727,589 | 2/1988 | Hirose et al. | 382/56 |

FOREIGN PATENT DOCUMENTS

| | | |
|---|---|---|
| 0108899 | 5/1984 | European Pat. Off. . |
| 0109614 | 5/1984 | European Pat. Off. . |

OTHER PUBLICATIONS

A. Bettencourt et al., "Net—A New Unix Based Transparent Networking System", Proceedings of the National Electronics Conference, vol. 37, 1983, pp. 309-315.
D. L. Tuomenoksa, "Tank Preloading Schemes for Reconfigurable Parallel Processing Systems", IEEE Transactions on Computers, vol. C-33, No. 10, Oct. 1984, pp. 895-905.
A. Norman et al., "Empact: A Distributed Database Application", AFIPS-Conference Proceedings, 1983, National Computer Conference, May 1983, pp. 203-217.
L. H. Land Weber et al., "Use of Multiple Networks in CSNET", COMPCON 82 -High Technology in the Information Industry, Feb. 1982, pp. 398-402.
Patent Abstract of Japan, vol. 8, No. 228, Oct. 19, 1984 (Fujitsu).

Primary Examiner—Thomas C. Lee
Assistant Examiner—Robert B. Harrell
Attorney, Agent, or Firm—Michael H. Shanahan

[57] ABSTRACT

Apparatus and method for distributing data from a central digital data processing system to remote digital data processing systems and apparatus for storing data in digital data processing systems. The central digital data system creates a data descriptor which describes the data and its source location. The central system provides the data descriptor to the remote systems. The remote systems employ the data descriptor to retrieve the data to be distributed and place it in a destination. A given digital data processing system may function as both a central system and a remote system. The data descriptor may be provided to the remote systems by means of magnetic media or a network and the data may be retrieved from magnetic media or via a network. When retrieval is via a network, the source of the data is an inventory library. The inventory library may be part of the central system or may be part of a different host system. The destination includes a live library and a run library. The data is retrieved to the live library, and when it is to be used, the remote system installs the data by placing it in the run library. Both test and production versions of data may be present in the destination and a test version may be converted to a production version. If both test and production versions are simultaneously present, one is always in the live library and the other always in the run library.

36 Claims, 30 Drawing Sheets

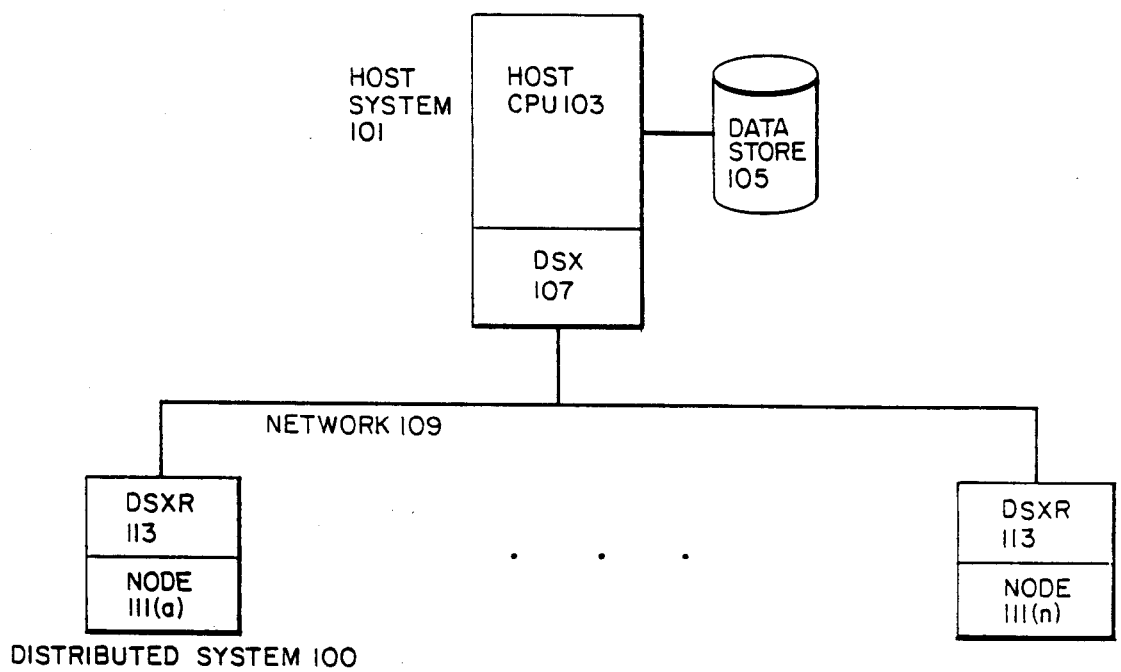
FIG. 1: PRIOR-ART DATA DISTRIBUTION IN A NETWORK
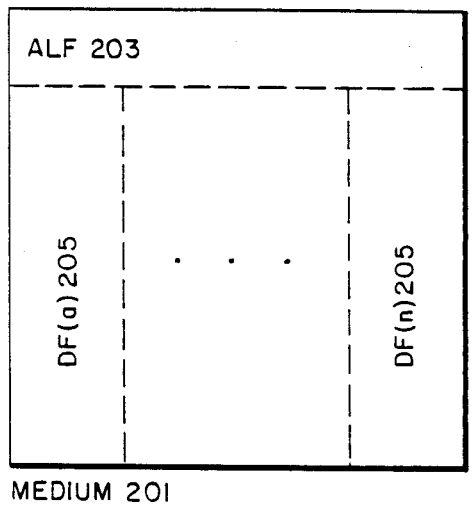
FIG. 2: PRIOR-ART DATA DISTRIBUTION VIA MEDIA

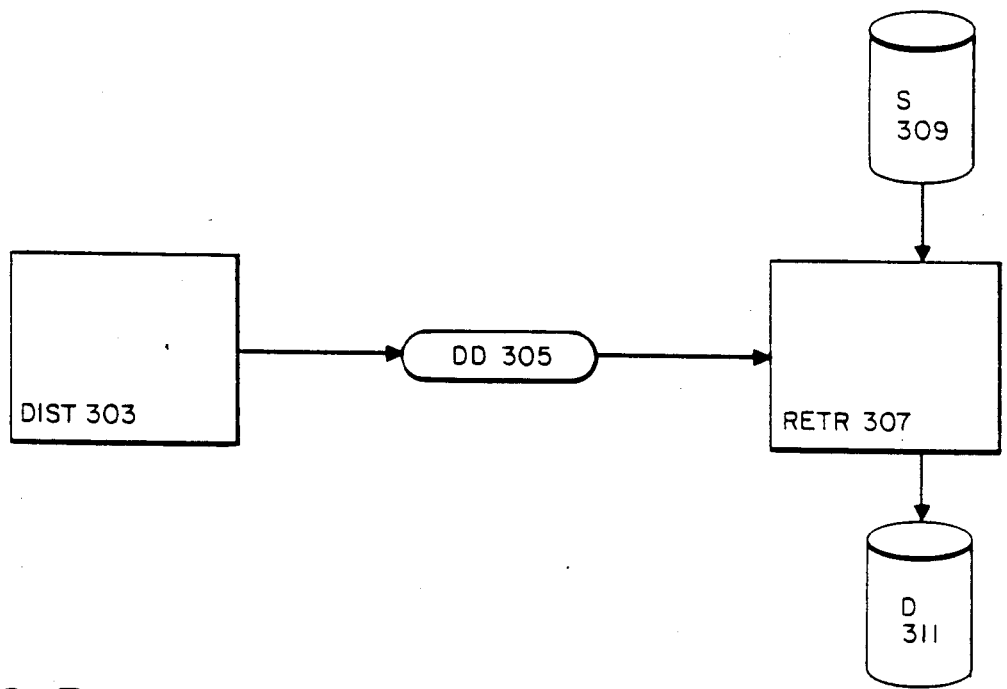
FIG. 3: CONCEPTUAL BLOCK DIAGRAM OF DATA DISTRIBUTION APPARATUS 301
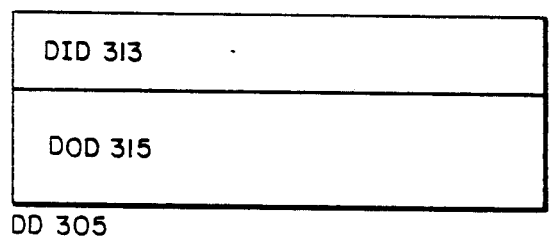
FIG. 3A: CONCEPTUAL STRUCTURE OF DD305
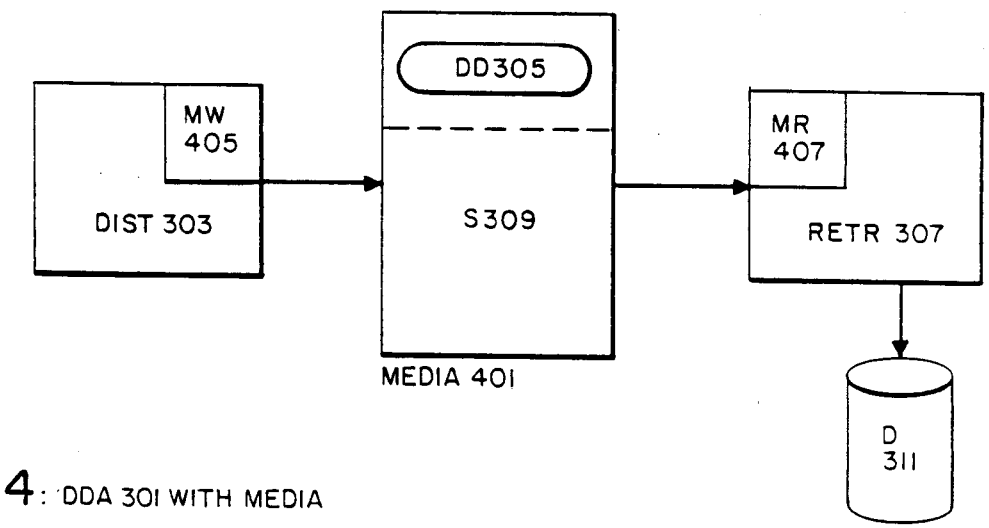
FIG. 4: DDA 301 WITH MEDIA

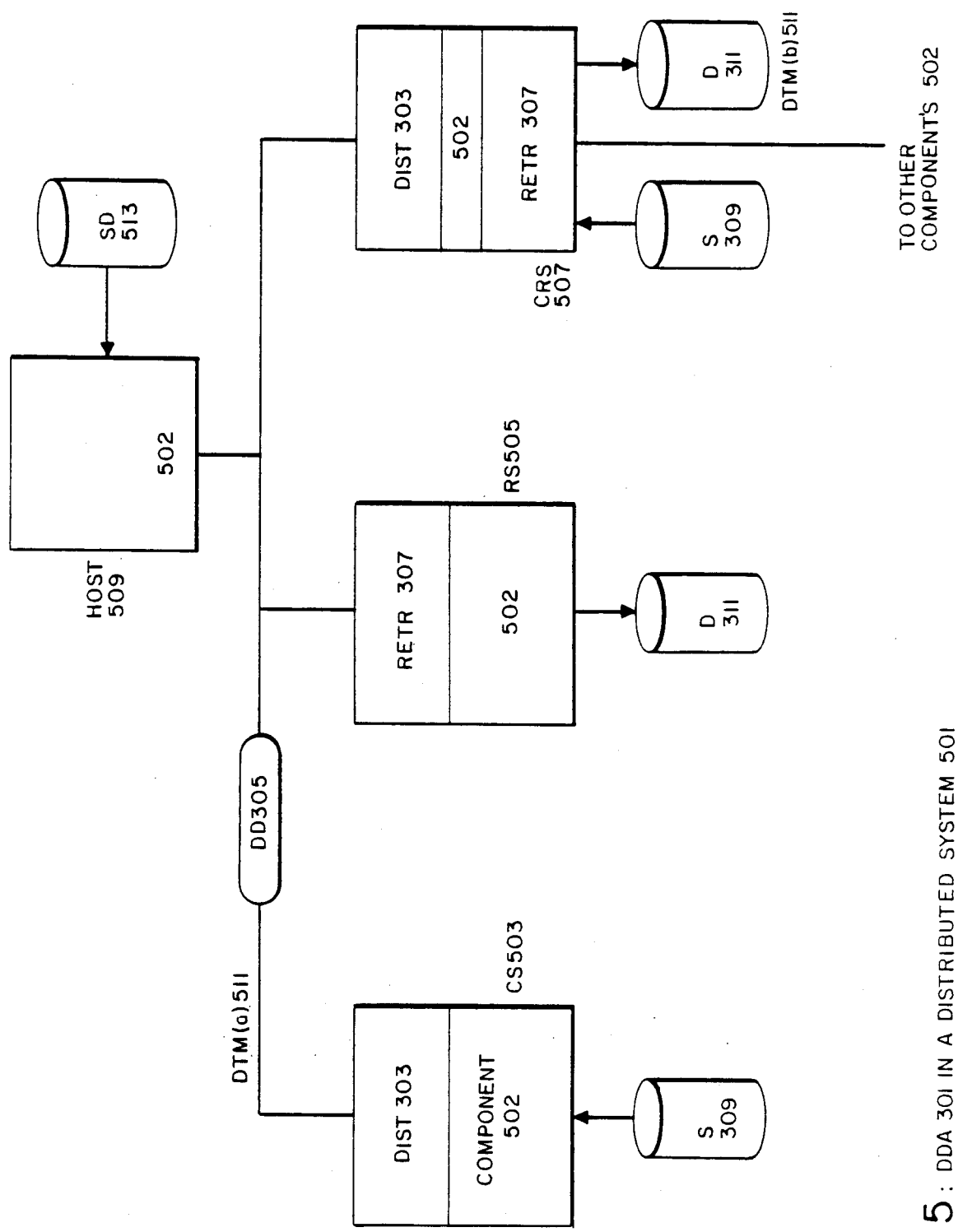
FIG. 5: DDA 301 IN A DISTRIBUTED SYSTEM 501

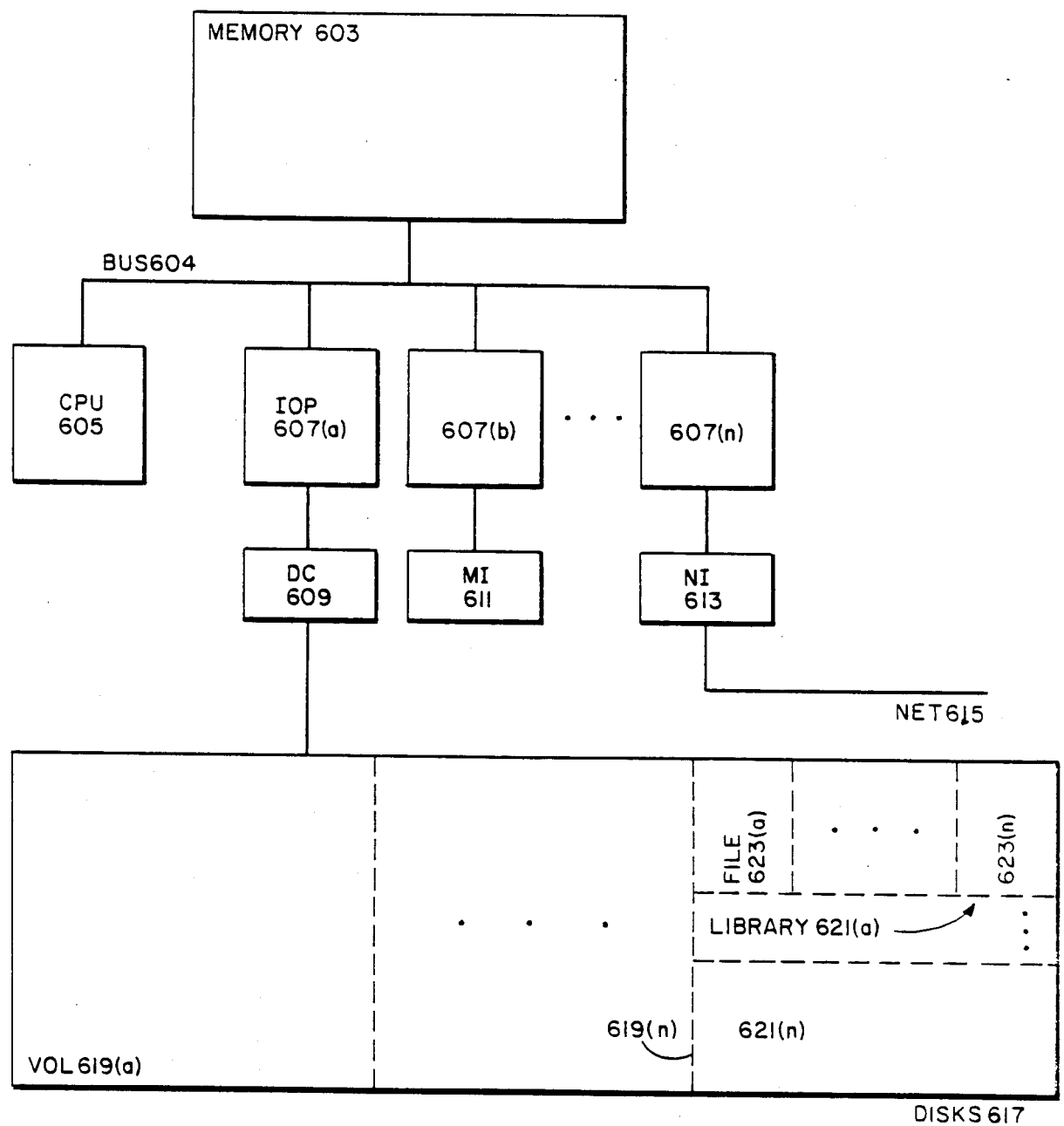
FIG. 6: VS SYSTEM 601 OVERVIEW

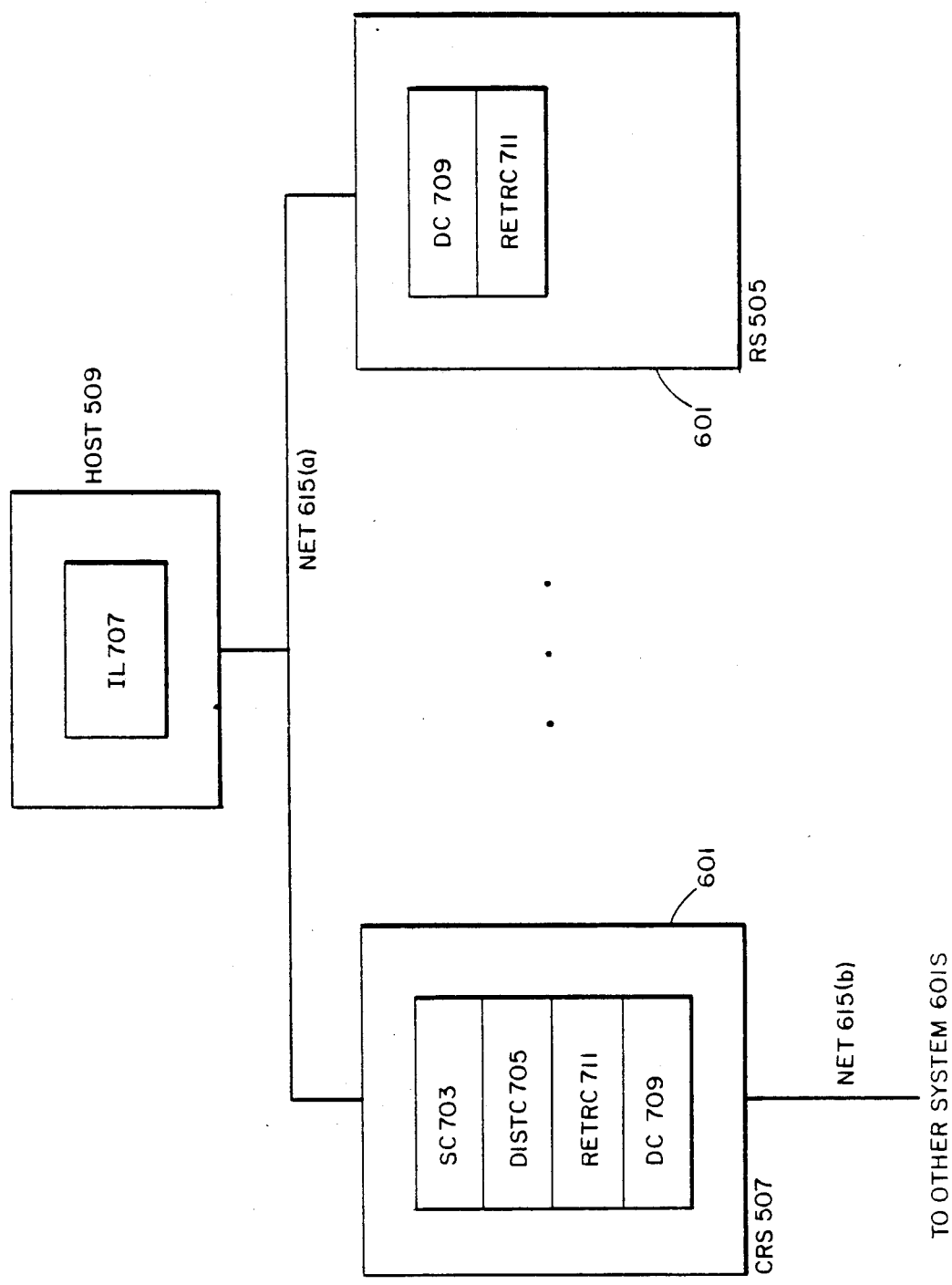
FIG. 7: OVERVIEW OF PREFERRED EMBODIMENT OF DDA 301

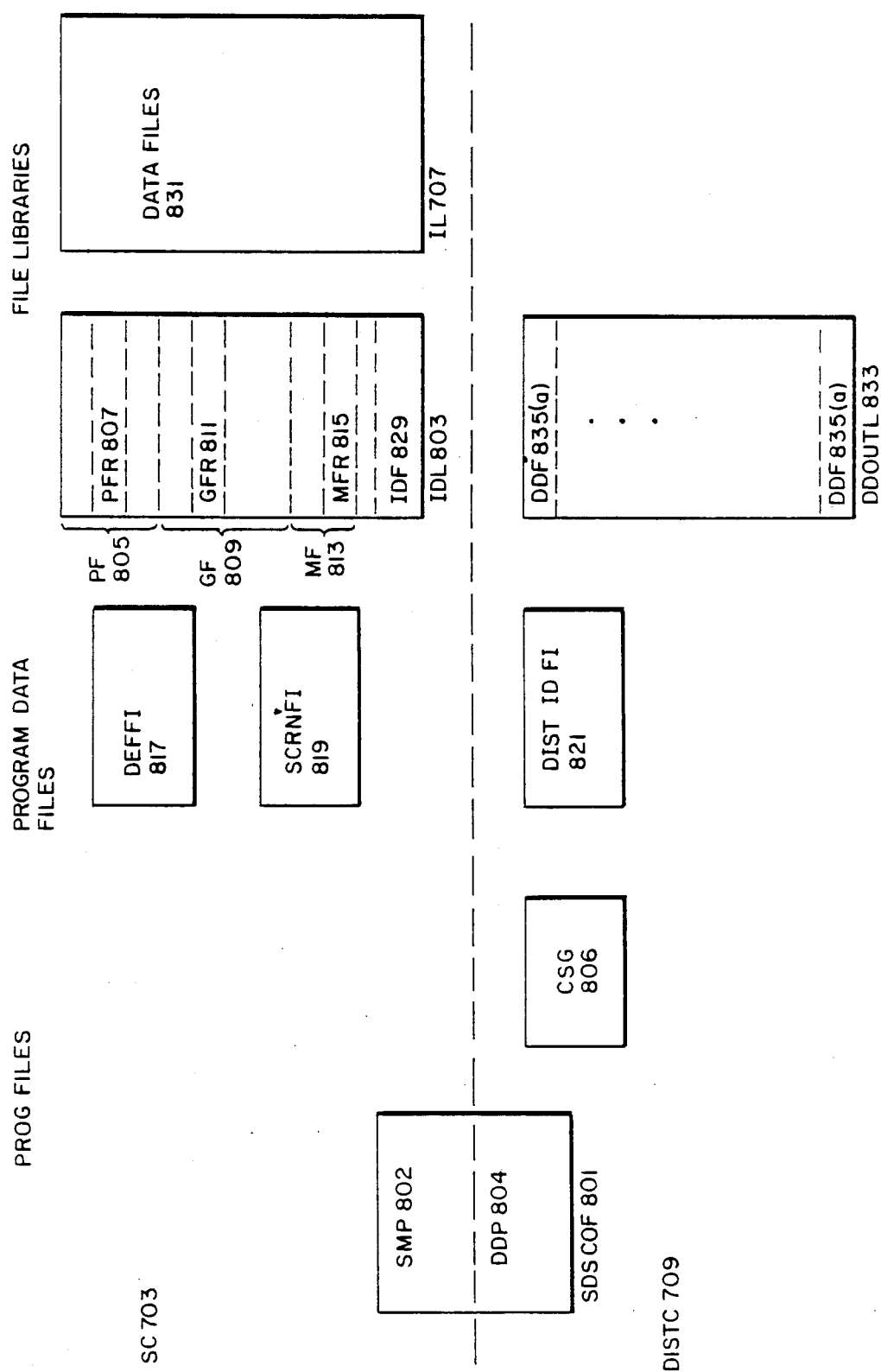
FIG. 8: COMPONENTS OF DISTC 709 AND SC 703

| PKG P/T | 903 | } PKG KEY 901 |
|---|---|---|
| PKG NAME | 905 | |
| PKG RELNO | 907 | |
| UPDATE REL | 908 | } PKG II 909 |
| PFRCS | 910 | |
| PKG STATUS | 912 | |

PFR 807

| GRP P/T | 913 | } GRP KEY 911 |
|---|---|---|
| PKG-NAME | 915 | |
| PKG-RELNO | 917 | |
| GRP-NAME | 919 | |
| GRPRCS | 920 | } GRPII 921 |
| GRPSTATUS | 922 | |

GFR 811

| MOD P/T | 925 | } MOD KEY 923 |
|---|---|---|
| PKG-NAME | 927 | |
| PKG-RELNO | 929 | |
| GRP-NAME | 931 | |
| MOD NAME | 933 | |
| MOD ID | 937 | } FILE INFO 935 |
| ILID | 939 | |
| VOLID | 940 | |
| MFRCS | 942 | } MOD II 941 |
| PROTD | 943 | |
| MOD STATUS | 945 | |
| MOD RL | 947 | |

MFR 815

FIG. 9: RECORDS IN FILES IN IDL 803

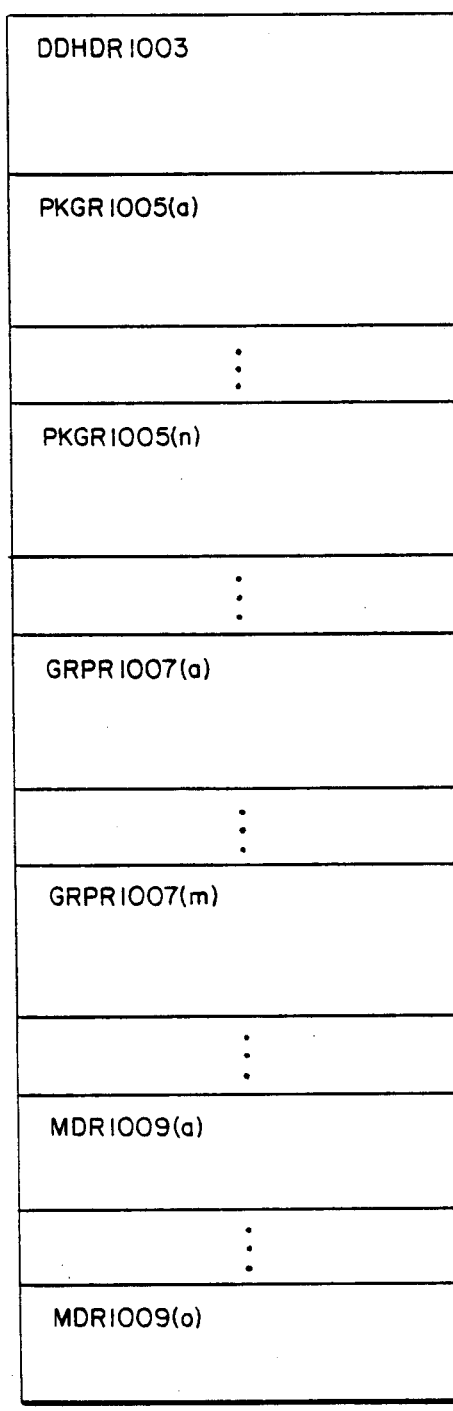
FIG. 10: DDF 835

| | | |
|---|---|---|
| RECTY | 1103 | ⎫ |
| PKNAME | 1105 | ⎬ DDHDRKEY 1101 |
| PKRELNO | 1107 | |
| GRNAME | 1109 | |
| MODNAME | 1111 | ⎭ |
| DISTD | 1113 | ⎫ |
| DISTIDIN | 1115 | ⎬ DIST INFO 1112 |
| DISTIDOUT | 1117 | |
| NO PKG | 1119 | ⎭ |
| RETR DATE | 1121 | ⎫ RETR TIME 1120 |
| RETR TOD | 1123 | ⎭ |
| INST DATE | 1125 | ⎫ INST TIME 1124 |
| INST TOD | 1127 | ⎭ |
| TRANS T | 1129 | ⎫ |
| CONF R | 1131 | |
| SSF | 1133 | |
| L/R | 1135 | ⎬ RI 1134 |
| SID | 1137 | |
| OID | 1139 | |
| RID | 1141 | |
| DL | 1143 | ⎭ |

DDHDR 1003

FIG. 11: DETAIL OF DDHDR 1003

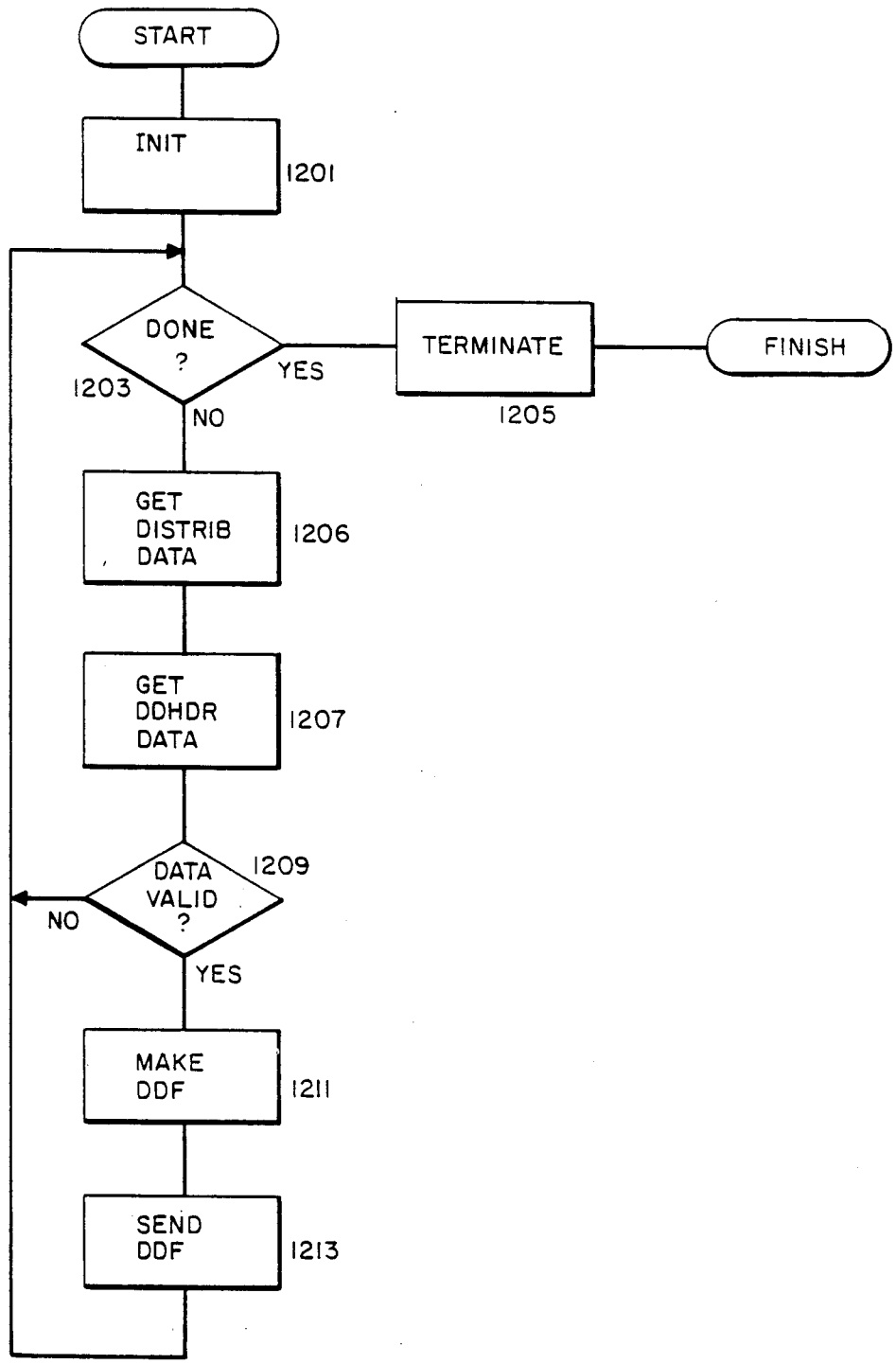
FIG. 12: FLOWCHART FOR PRODUCTION OF DDF 835

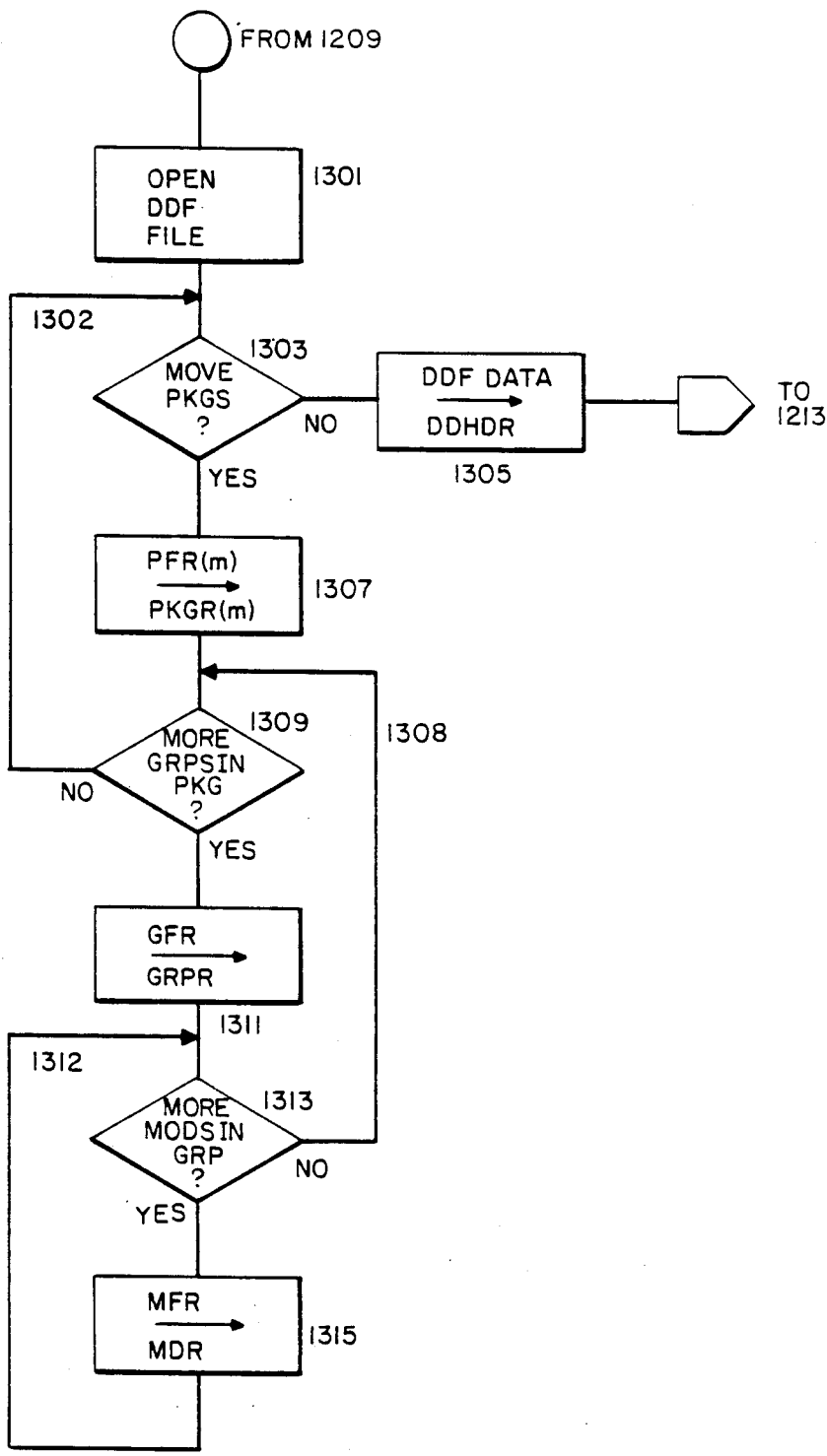
FIG. 13: FLOWCHART FOR BLOCK 1211

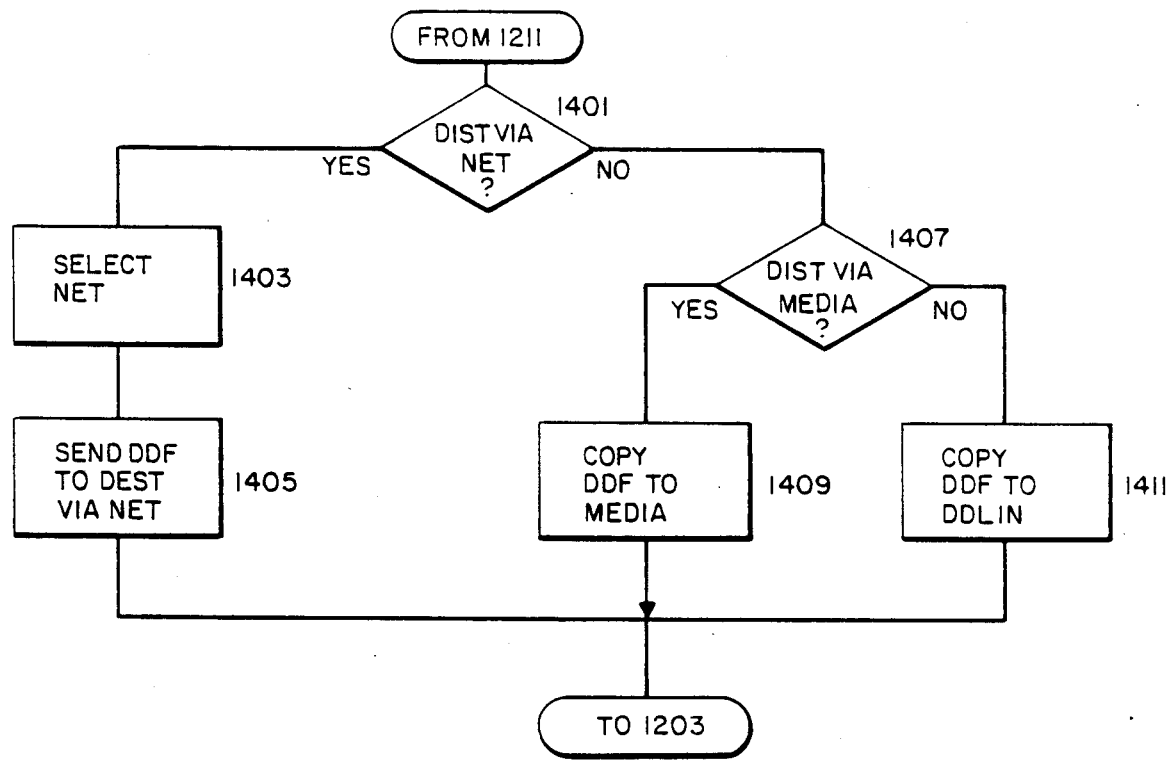
FIG. 14: FLOWCHART FOR BLOCK 1213

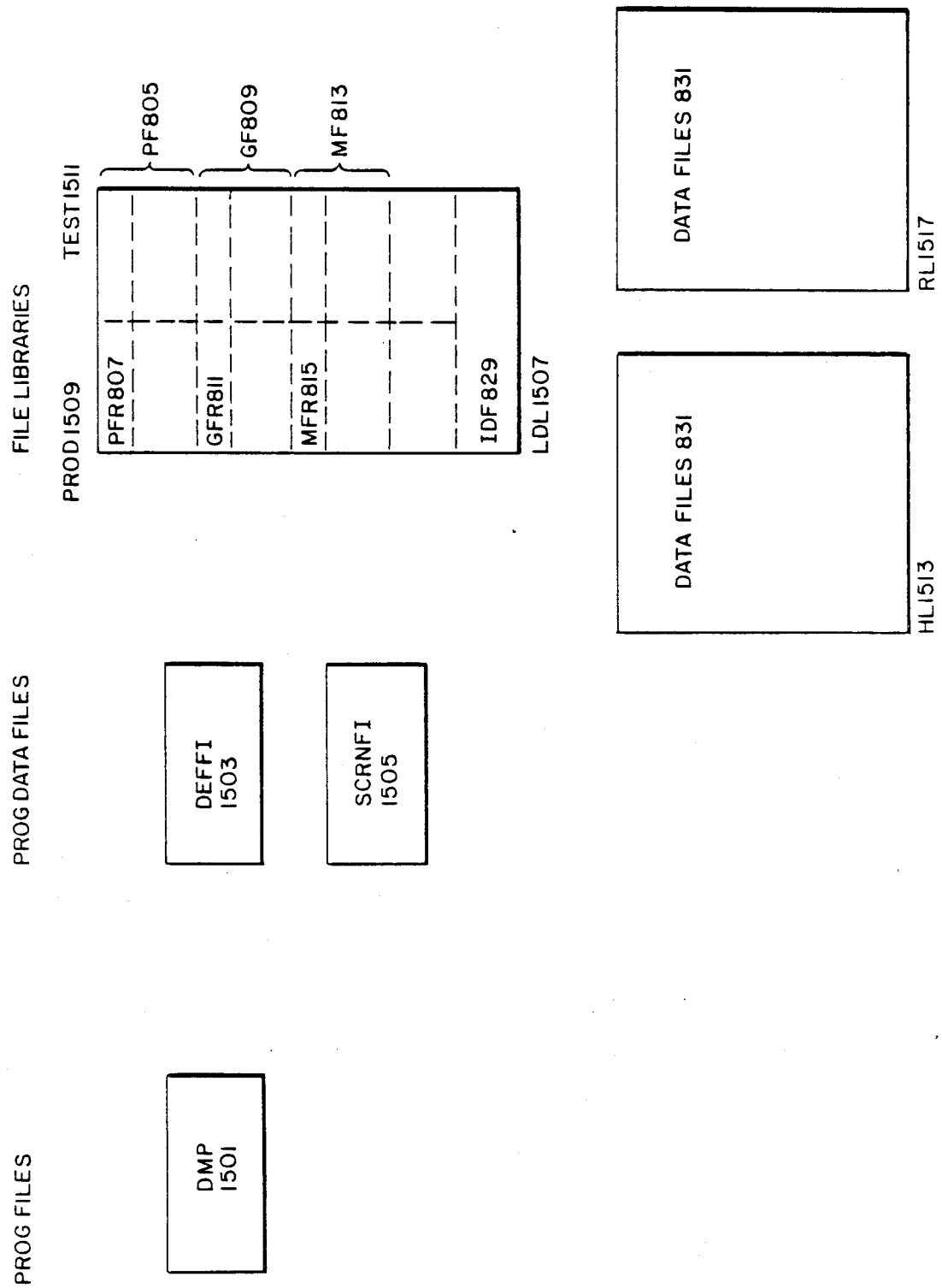
FIG. 15: COMPONENTS OF DC 709

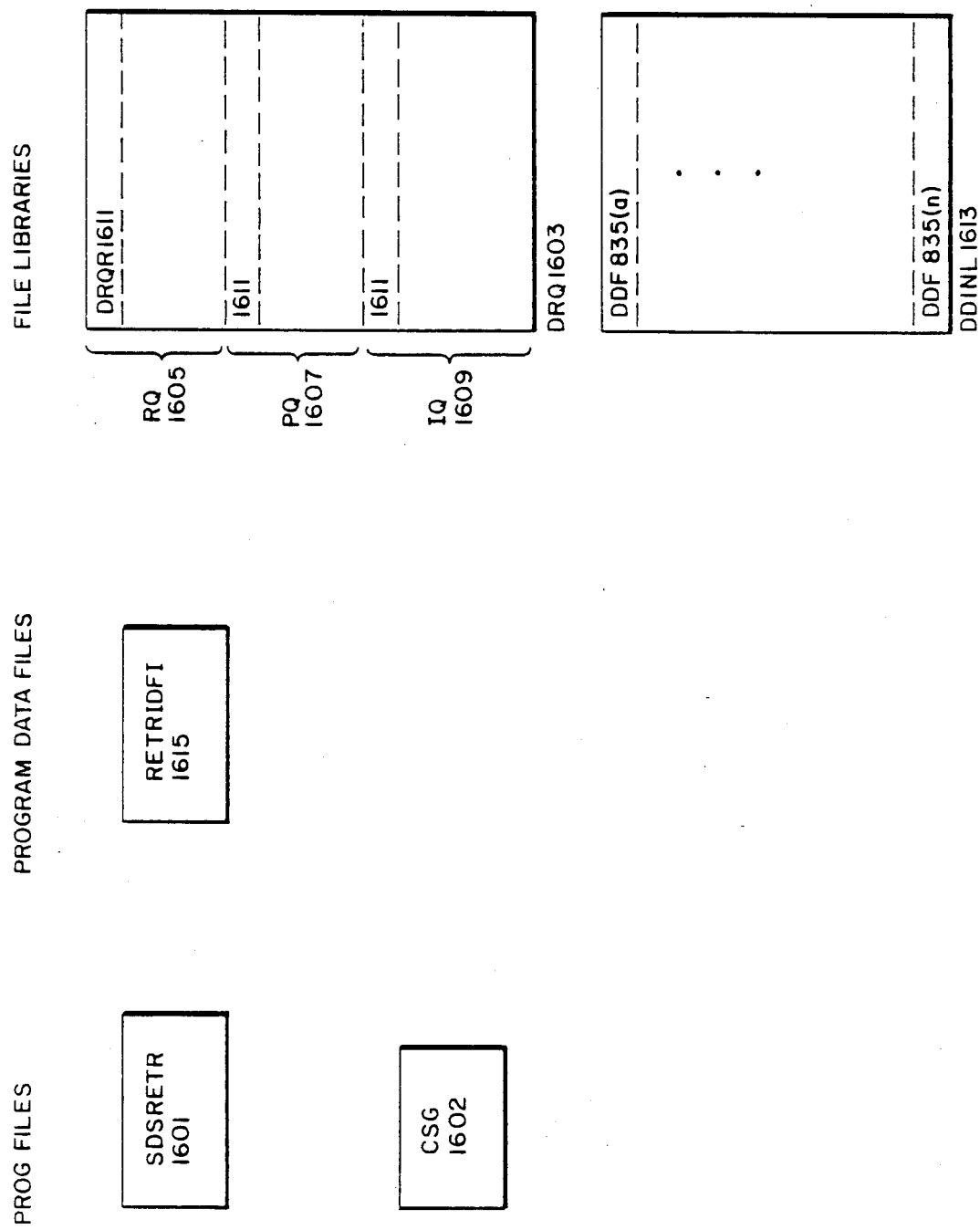
FIG. 16: COMPONENTS OF RETRC 711

| | | |
|---|---|---|
| MO | 1703 | ⎫ |
| DAY | 1705 | ⎬ DRQR KEY 1701 |
| DDFID | 1707 | ⎭ |
| LU DATE | 1711 | ⎫ |
| LU TIME | 1713 | ⎬ QI 1709 |
| QUEUE | 1715 | |
| STATUS | 1717 | ⎭ |
| RETR TOD | 1721 | |
| RETR DATE | 1723 | |
| INST TOD | 1725 | |
| INST DATE | 1729 | |
| MOD REC CTR | 1731 | |
| MOD REQ CTR | 1733 | |
| NO PKGS | 1735 | ⎬ RII 1719 |
| TRANS T | 1737 | |
| SKIP/REPL | 1739 | |
| HOST/CENT | 1741 | |
| IL/HL | 1743 | |
| NET/MEDIA | 1745 | |
| ORIG DDFID | 1747 | |
| ORIG NAME | 1749 | |
| COMPLETE IND | 1751 | |

DRQR 1611

FIG. 17: DRQR DETAIL

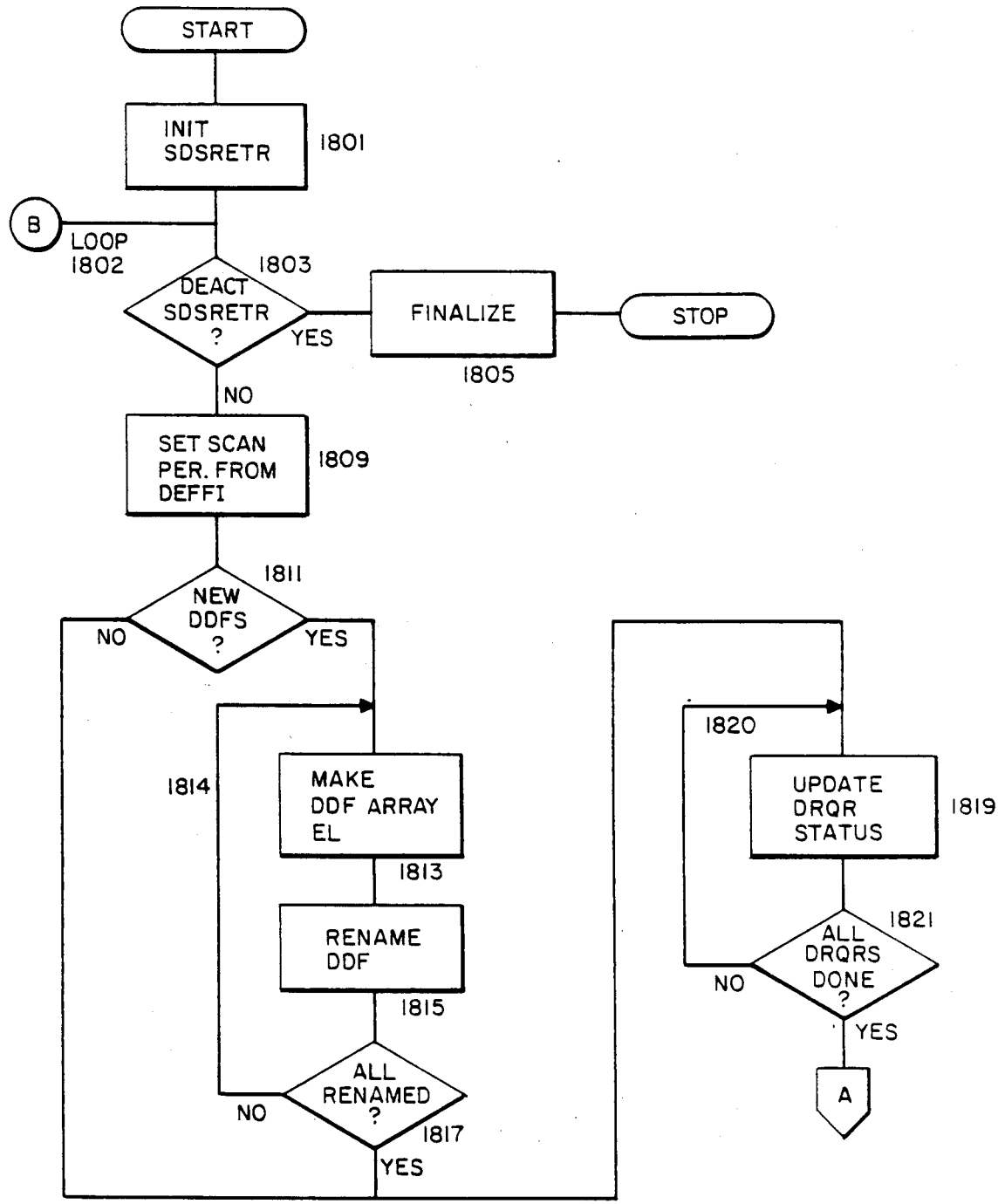
FIG. 18: PROCESSING OF DDF 835 BY SDSRETR 1601

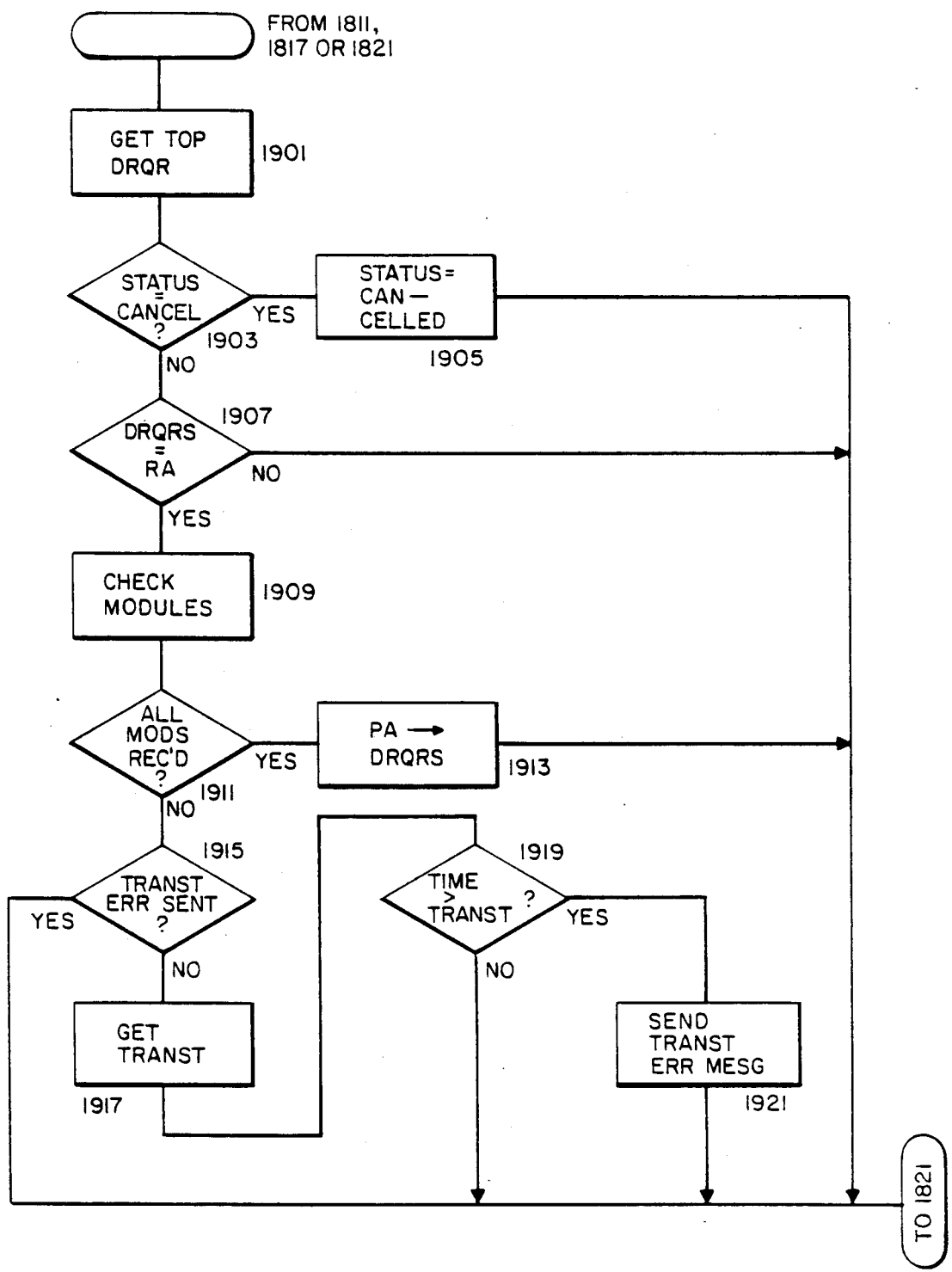
FIG. 19: UPDATE DDRQR STATUS 1819 DETAIL

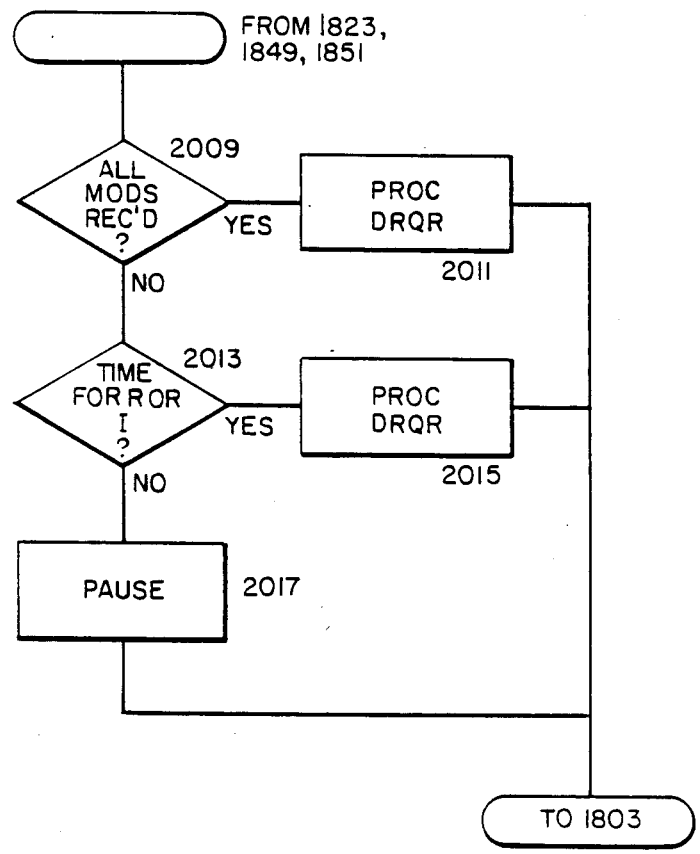
FIG. 20: PROCESS DRQR OR PAUSE 1843 DETAIL

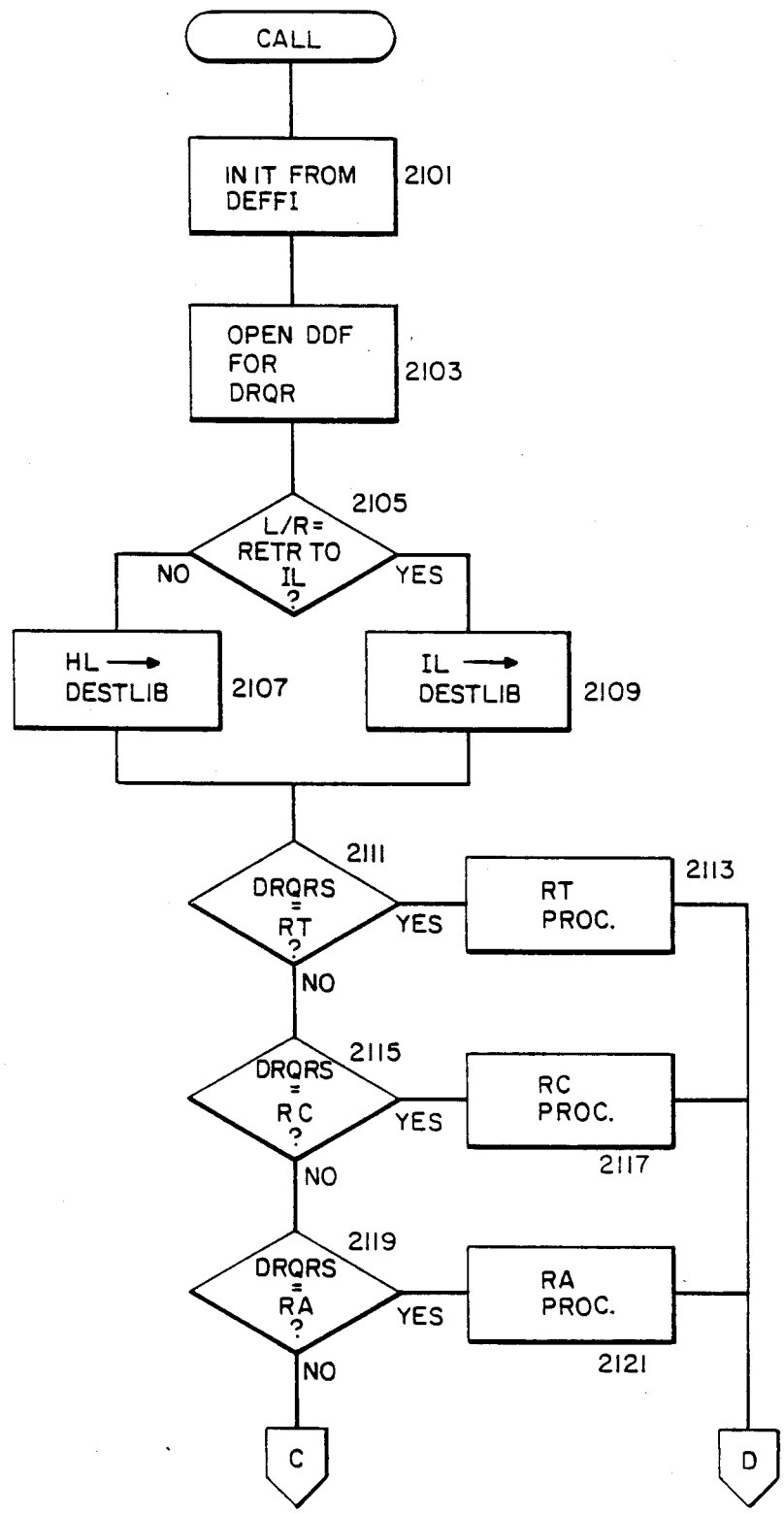
FIG. 21: PROCESS DRQR 2011, 2015 DETAIL

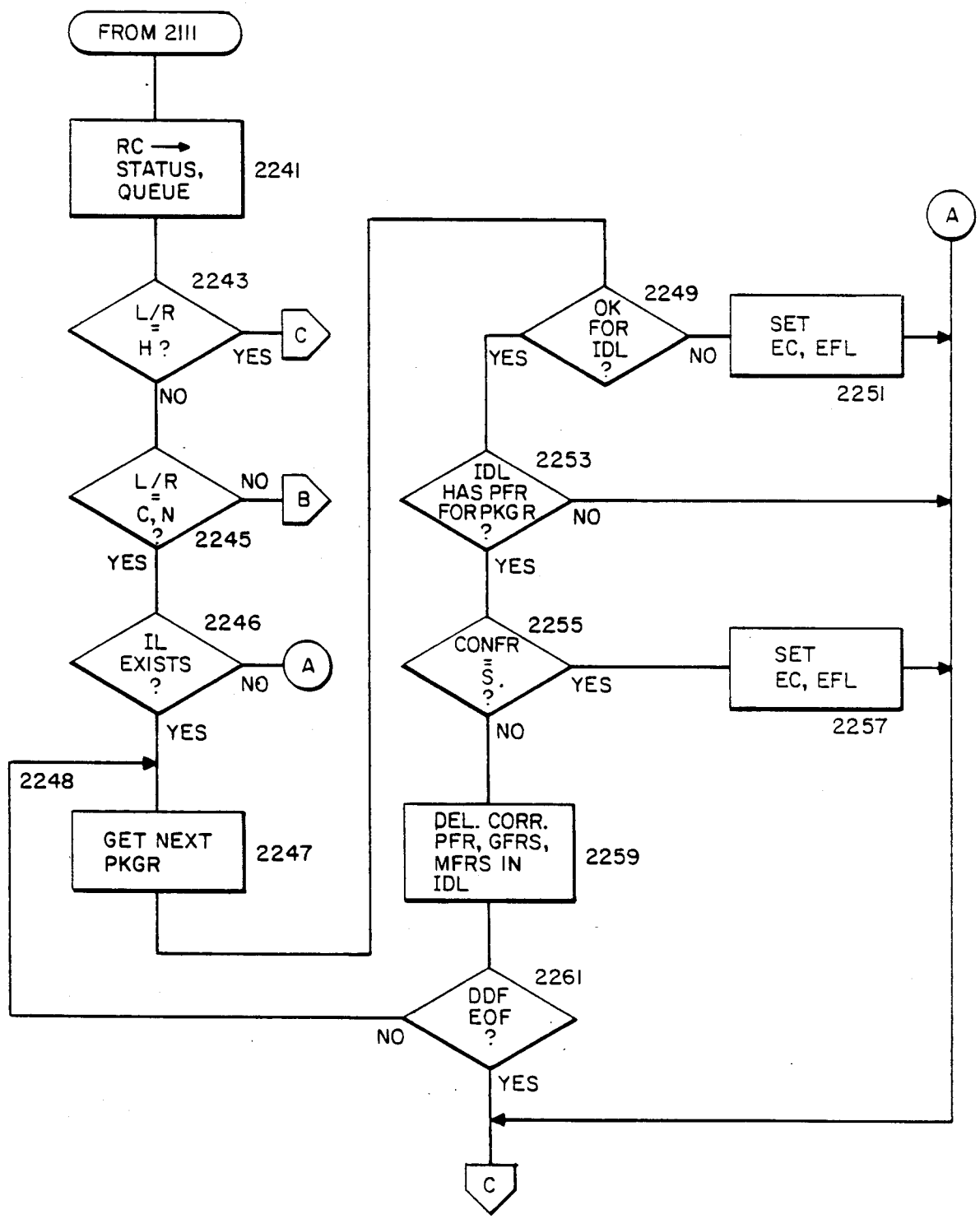
FIG. 22: DETAIL OF RT PROCESSING 2113

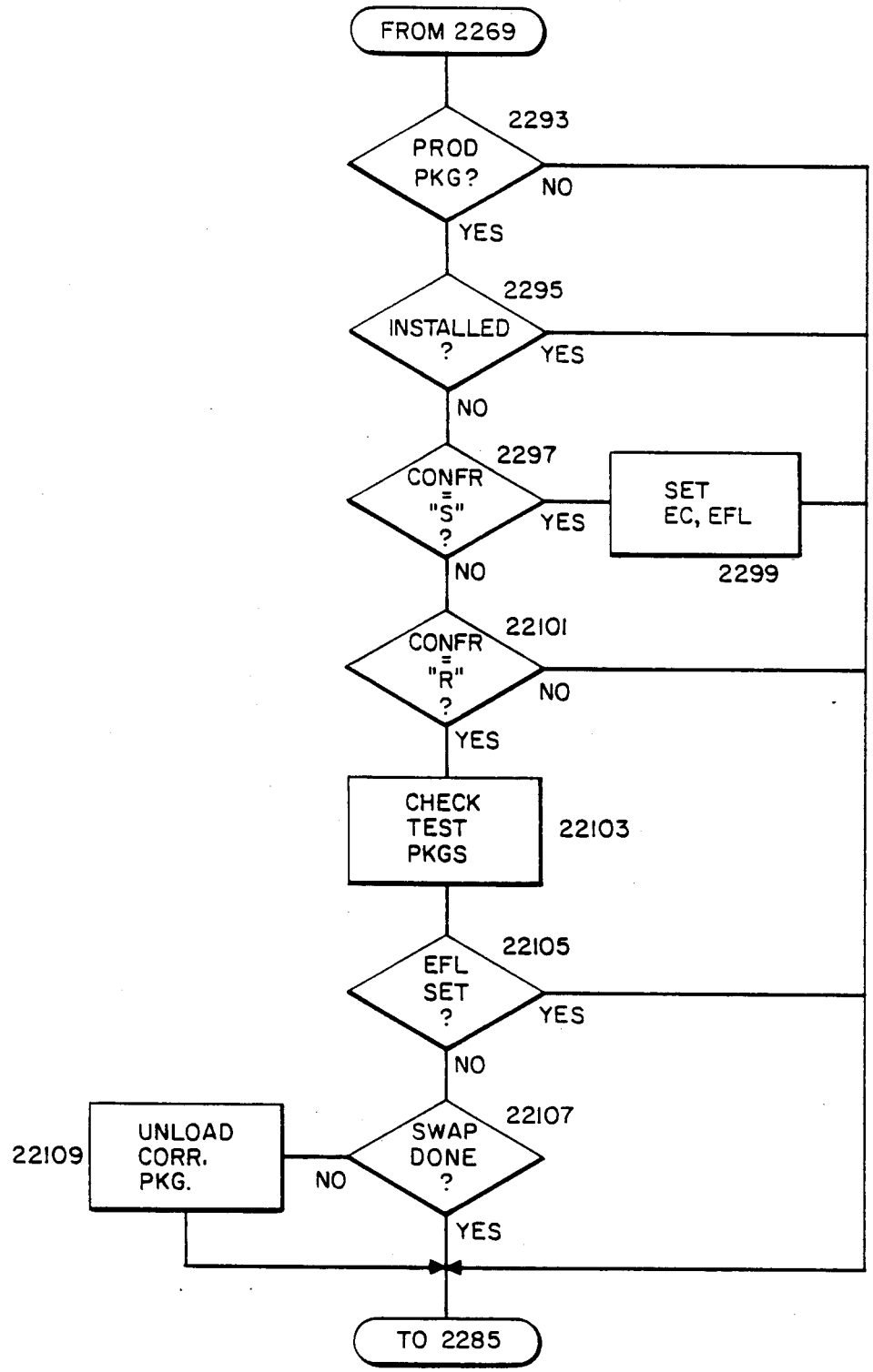
FIG. 22C: DETAIL OF BLOCK 2283

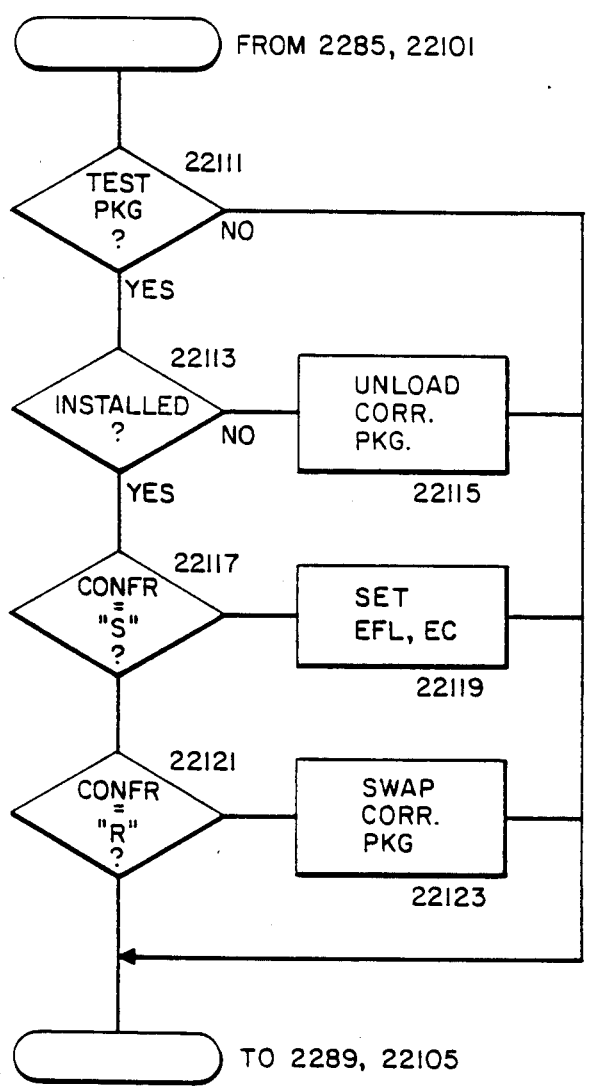
FIG. 22D: DETAIL OF BLOCKS 2287, 22103

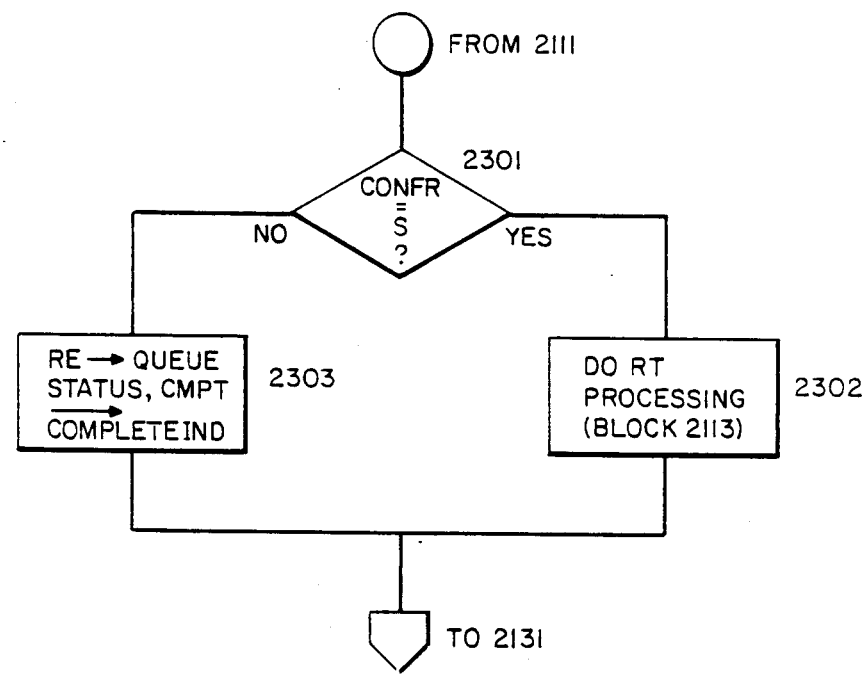
FIG. 23: RC PROCESSING 2117 DETAIL

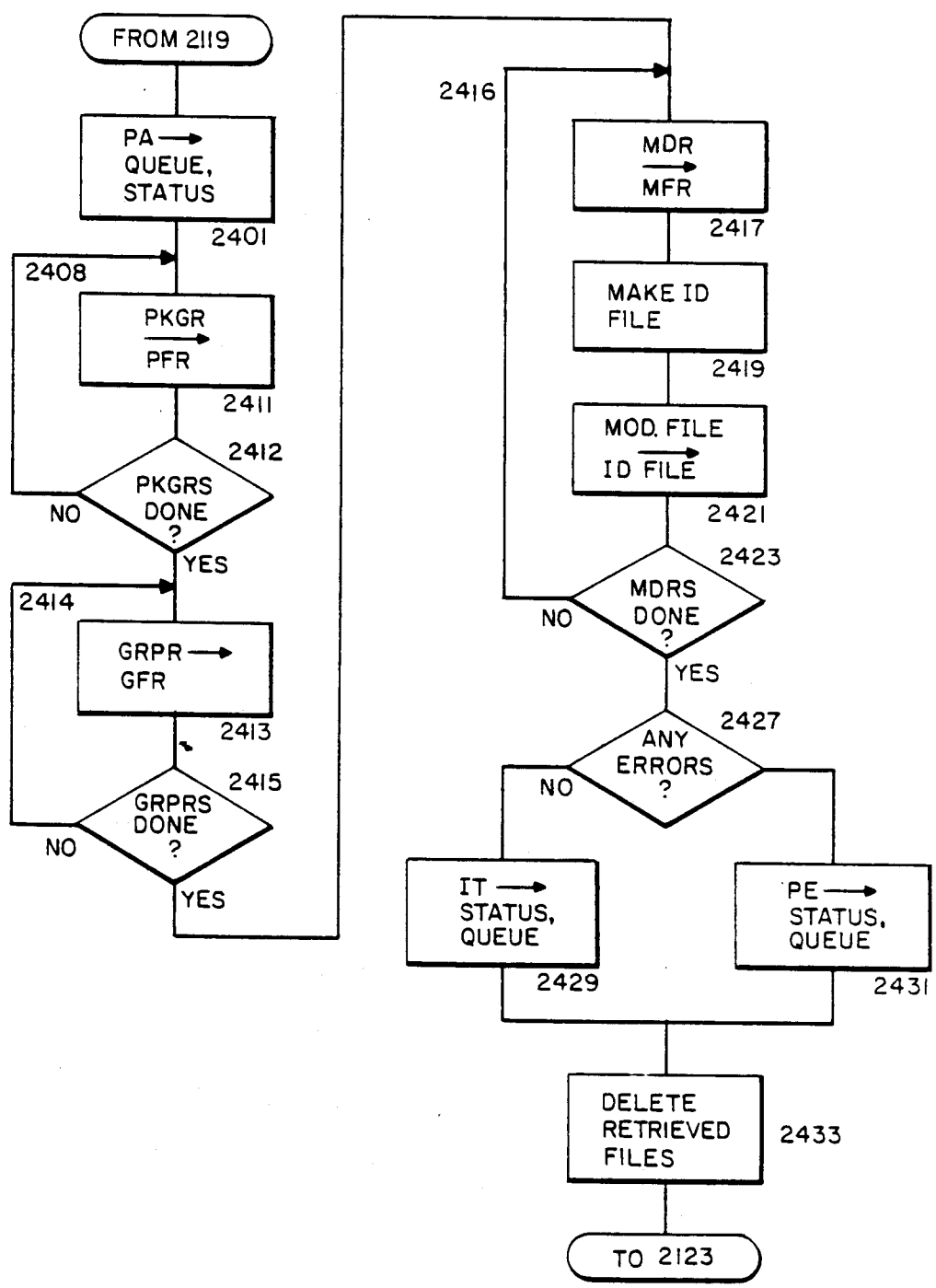
FIG. 24: RA PROCESSING 2121 DETAIL

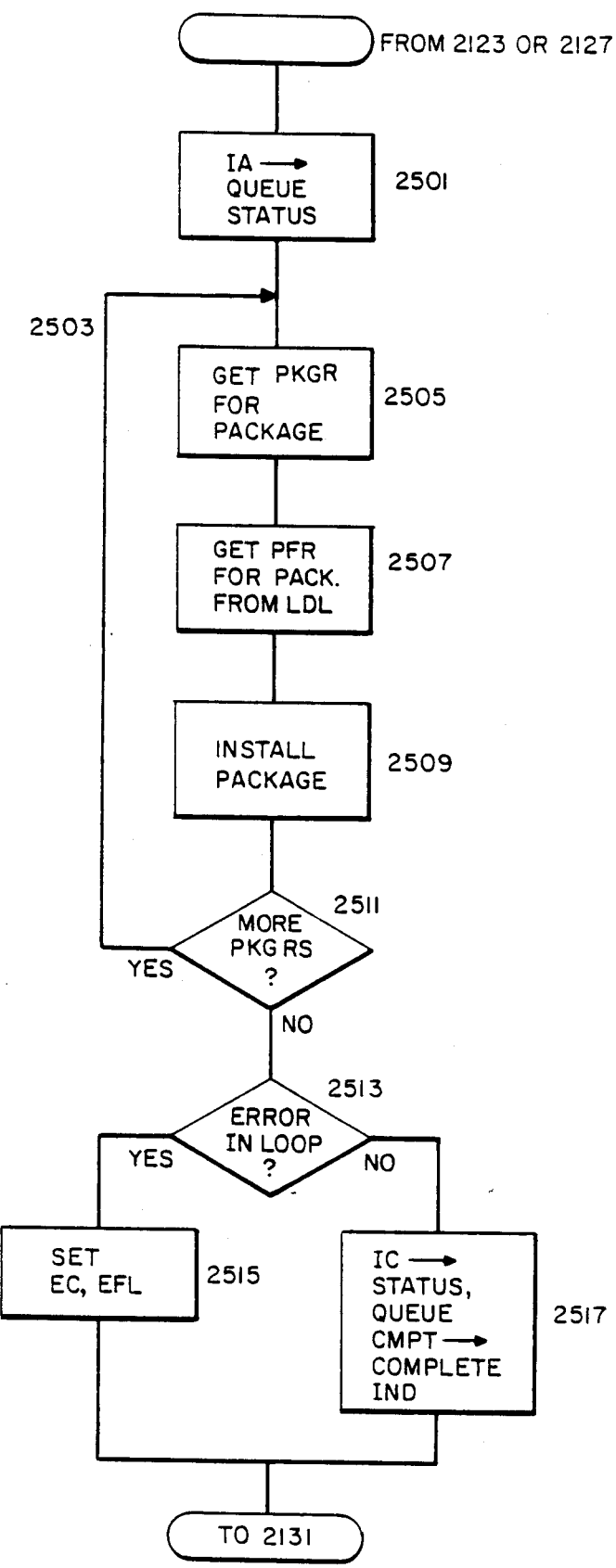
FIG. 25: INSTALL PROCESSING 2125 DETAIL

DATA DISTRIBUTION APPARATUS AND METHOD HAVING A DATA DESCRIPTION INCLUDING INFORMATION FOR SPECIFYING A TIME THAT A DATA DISTRIBUTION IS TO OCCUR

CROSS REFERENCES TO RELATED APPLICATIONS

This is a continuation of copending application Ser. No. 06/762,098, filed on Aug. 2, 1985, now abandoned.

BACKGROUND OF THE INVENTION

1. Field of the Invention

The present invention relates to data processing systems and more particularly to apparatus and methods used to transfer data from one data processing system to another.

2. Description of the prior art: FIGS. 1 and 2

Ways of transferring data from one computer system to another are as old as computer systems themselves. Two general methods of transferring data have evolved: if each system has access to a network, the network may be used to transfer the data. If no network is available, the data is transferred by means of media such as punched cards, punched tape, magnetic tape, or magnetic disks. In both cases, what to do with the transferred data was at first left completely up to the system which received it. However, this approach became progressively less satisfactory for two reasons: first, the separate computer systems became components of a single distributed computer system and consequently were required to operate in close cooperation with one another. Second, as computer systems became more numerous, their users were more and more often lay people who had considerable difficulty with the complexities of organizing the transferred data into a functioning entity. Often, the problems arose together. For example, a large company might operate a distributed computer system with remote component systems which were operated by sales, service, clerical, or secretarial personnel. In such systems, such non-technical people might be required to receive and install complex data bases and programs or updates to data bases or programs on the remote systems. Further, mistakes made in installation might affect the performance of the entire distributed system.

The prior art has developed two techniques to deal with the problems which have arisen in the distribution of data. One of them is used to distribute data to component systems connected by a network; the other is used to distribute data by means of media. The first technique is exemplified by the IBM Distributed System Executive, described in Distributed Systems Executive Version 3 General Information, GH 19-6394-1, International Business Machines Corporation, 1984. FIG. 1 provides an overview of the Distributed Systems Executive (DSX). As shown in that figure, distributed system 100 in which DSX is used consists of a host system 101 including host CPU 103, data store 105, and DSX software 107 which runs on host CPU 103. Host system 101 is connected by means of network 109 to one or more node systems 111(a) through 111(n). Each node 111 has executing on it DSX Receive (DSXR) software 113. Parameters provided by the operator of host system 101 to DSX 107 describe the configuration of network 109 and nodes 111.

Data is transferred from host system 101 to a node 111(a) in distributed system 100 as follows: a user of the host system specifies to DSX the kind and name of the data to be transferred, the nodes to which the transfer is to be made, and conditions of the transfer, for example, when the transfer is to be made or whether it depends on the successful completion of a preceding transfer. At the time specified for the transfer, DSX initiates a session on network 109 between host system 101 and the node 111(a) to which the transfer is to be made. DSXR 113 in node 111(a) responds to the initiated session and prepares to receive the transferred data. To perform the actual transfer, DSX 107 provides a protocol containing the data to be transferred to network 109, which transmits the protocol to node 111(a). DSXR 113 responds to the protocol and performs whatever actions are required to install the data being sent in node 111(a).

As can be seen from the above description, DSX has a number of inflexibilities. First, the system in which it is used must be hierarchical. A host 101 cannot be a node 111 and host system 101 always provides data and the nodes 111 always receive data. Further, in the system shown in FIG. 1, transfers may be initiated only by host system 101. Second, DSX uses a special protocol provided by network 109 to transfer the data to nodes 111. Consequently, DSX may be used only with network 109 and not with other networks which do not provide such a protocol. Third, installation occurs in DSX at the time the protocol is received in node 111, even though that time may be inconvenient for node 111.

In an effort to overcome some of the inflexibility of the hierarchical system of FIG. 1, the prior art has provided a variation, known as Distributed Systems Network Executive (DSNX), in which certain special nodes 111 are DSNX nodes 111. DSNX nodes 111 may make data available for transfer from DSNX node 111 to host system 101. DSX 107 then initiates a session with DSNX node 111 and transfers the data from DSNX node 111 to host 101. From there, DSX 107 can transfer the data to nodes 111 in the manner just described. Without DSNX, all data to be transferred to nodes 111 must be developed on host system 101; with DSNX, data to be transferred may be developed on a DSNX node 111 and DSX can retrieve the data from that node to host 101 and transfer it from there to other nodes 111. However, even in DSNX, nodes and hosts are distinct and only host 101 can initiate a transfer.

The technique used when data is distributed on media is to include as part of the data a program which correctly installs the remainder of the data in the media on the computer system for which it is intended. FIG. 2 presents a schematic overview of the contents of the media when this approach is used. Medium 201 may be any medium such as punched tape or cards, magnetic tape, or magnetic disks used to transfer data between computer systems. The data is contained in data files (DF) 205 (a) through (n). the loading program is contained in automatic loading file (ALF) 203. The user of the computer system loads ALF file 203 from the media and then executes it on the computer system. The program in ALF file 203 then loads files DF 205(a) through (n).

An essential distinction between this technique and prior-art distribution via a network is that here, the recipient computer system has an active instead of a passive role. Because of this distinction, data distributed across a network and via media cannot presently be dealt with in the same manner by the recipient system. This fact in turn increases the expense and complexity of data distribution, particularly where a distributed system has some component systems which are connected by a network and others which are not or where the cost of using a network is an important consideration in data distribution. An additional problem of prior-art media distribution is that loading programs of the type of ALF 203 are generally specific to the data contained in the medium, not to the system which is receiving the data. For example, the loading program may set up file names or directory systems which are inconsistent with those already present in the recipient computer system. Depending on how the recipient computer system handles such conflicts, the result may be a failure of the installation program or a loss of data in the recipient computer system.

SUMMARY OF THE INVENTION

The present invention relates to apparatus and methods for distributing data to computer systems and more specifically to apparatus and methods used in distributed computer systems to distribute data to remote components. Using the apparatus and methods, data may be distributed across a network connecting component systems of a non-hierarchical distributed computer system and may be distributed in the same manner to component systems which receive the data via a network as to component systems which receive the data on media.

The data distribution apparatus includes a source for the data to be distributed, a destination to which it is to be distributed, apparatus which creates a system data descriptor describing the data to be distributed, and retrieval apparatus which has access to the source and the destination and which receives the system data descriptor and responds thereto by transferring the described data from the source to the destination.

The source and destination may be any means for storing data and will typically be computer system memory, disk drives, or media. The data distribution and retrieval apparatus will typically be processors executing on the one hand a program for creating the data descriptor and on the other hand a program for receiving the data descriptor, reading it, and fetching the data specified therein. Various configurations are possible. When the invention is employed in a system having a number of processors, the distribution apparatus may be part of a central computer system and the retrieval apparatus may be part of a remote computer system. In some such systems, certain processors may have both the distribution apparatus and the retrieval apparatus and consequently function as both central and remote processors. In other such systems, the source of all software may be a host system. The data descriptor and the data may be transferred over a network or may both be included on media prepared by a central system and sent to a remote system. In computer systems having file systems, the data descriptor and the data may both be contained in files and may be transferred in any manner available to the system for the transfer of files.

In a preferred embodiment, the data distribution apparatus is used to distribute software, i.e., executable program files and certain other files containing data necessary for execution of the executable program files. The software is distributed in the form of packages. A package is all of the executable program and other files necessary to make a software product such as an editor program or an application program work. The package may be a new package, a replacement for an existing package, or an update of an existing package. In the latter case, only those files required to update the existing package are distributed.

The source in a preferred embodiment consists of an inventory library for the files containing the data to be transferred and a data base describing the contents of the inventory library. The destination consists of a holding library in which the software is to be stored until it is to be used, a run library in which software being executed is installed, and a data base describing the contents of the holding and run libraries.

The data descriptor may contain not only a description of the data to be distributed, but also retrieval and installation information. Retrieval information may include the time and date at which the data is to be retrieved and actions to be taken if a copy of the data already exists at the destination. Installation information may include the time and date of installation.

It is thus an object of the invention to provide improved apparatus and methods for transferring data between a source and a destination;

It is another object of the invention to provide improved apparatus and methods for transferring data between systems in a non-hierarchical network;

It is a further object of the invention to provide apparatus and methods for transferring data which may be used both with systems in a network and with systems where the data is transferred on media;

It is an additional object of the invention to provide apparatus and methods for transferring data which require no special network protocols;

It is yet another object of the invention to provide apparatus and methods for transferring data including improved means for specifying how the data is to be installed at the destination.

Other objects and advantages of the present invention will be understood by those of ordinary skill in the art after referring to the detailed description of a preferred embodiment contained herein and to the drawings, wherein:

BRIEF DESCRIPTION OF DRAWINGS

FIG. 1 is a block diagram of prior-art data distribution in a network.

FIG. 2 is a diagram of prior-art data distribution via media.

FIG. 3 is a conceptual block diagram of the data distribution apparatus of the present invention.

FIG. 3A is a diagram of the conceptual structure of the data descriptor of the present invention.

FIG. 4 is a conceptual block diagram of data distribution using the present invention when the data is distributed using media.

FIG. 5 is a conceptual block diagram of data distribution using the present invention in a distributed system.

FIG. 6 is an overview of the VS computer system in which a preferred embodiment of the present invention is implemented.

FIG. 7 is a block diagram of the structure of the present invention in a preferred embodiment.

FIG. 8 is a block diagram of the components of DISTC 709 and SC 703.

FIG. 9 shows the form of records in files in IDL 803.

FIG. 10 shows a preferred embodiment of DDF 835.

FIG. 11 is a detailed diagram of DDHDR 1003

FIG. 12 is a flowchart showing the production of DDF 835 in CS 701

FIG. 13 is a detail of block 1211 of the flowchart of FIG. 12.

FIG. 14 is a detail of block 1213 of the flowchart of FIG. 12.

FIG. 15 is a block diagram of the components of DC 709.

FIG. 16 is a block diagram of the components of RETRC 711.

FIG. 17 shows a detail of the form of DRQR 1611 in a preferred embodiment of RETRC 711.

FIGS. 18 and 18A are a flowchart showing the processing of DDF 835 by SDSRETR 1601.

FIG. 19 is a flowchart showing a detail of block 1819 of FIG. 18.

FIG. 20 is a flowchart showing a detail of block 1843 of FIG. 18.

FIGS. 21 and 21A are a flowchart showing a detail of blocks 2011 and 2015 of FIG. 20.

FIGS. 22, 22A, 22B, 22C, 22D, and 22E are a flowchart showing a detail of block 2113 of FIG. 21.

FIG. 23 is a flowchart showing a detail of block 2117 of FIG. 21.

FIG. 24 is a flowchart showing a detail of block 2121 of FIG. 21.

FIG. 25 is a flowchart showing a detail of block 2125 of FIG. 21.

Figure 18A:
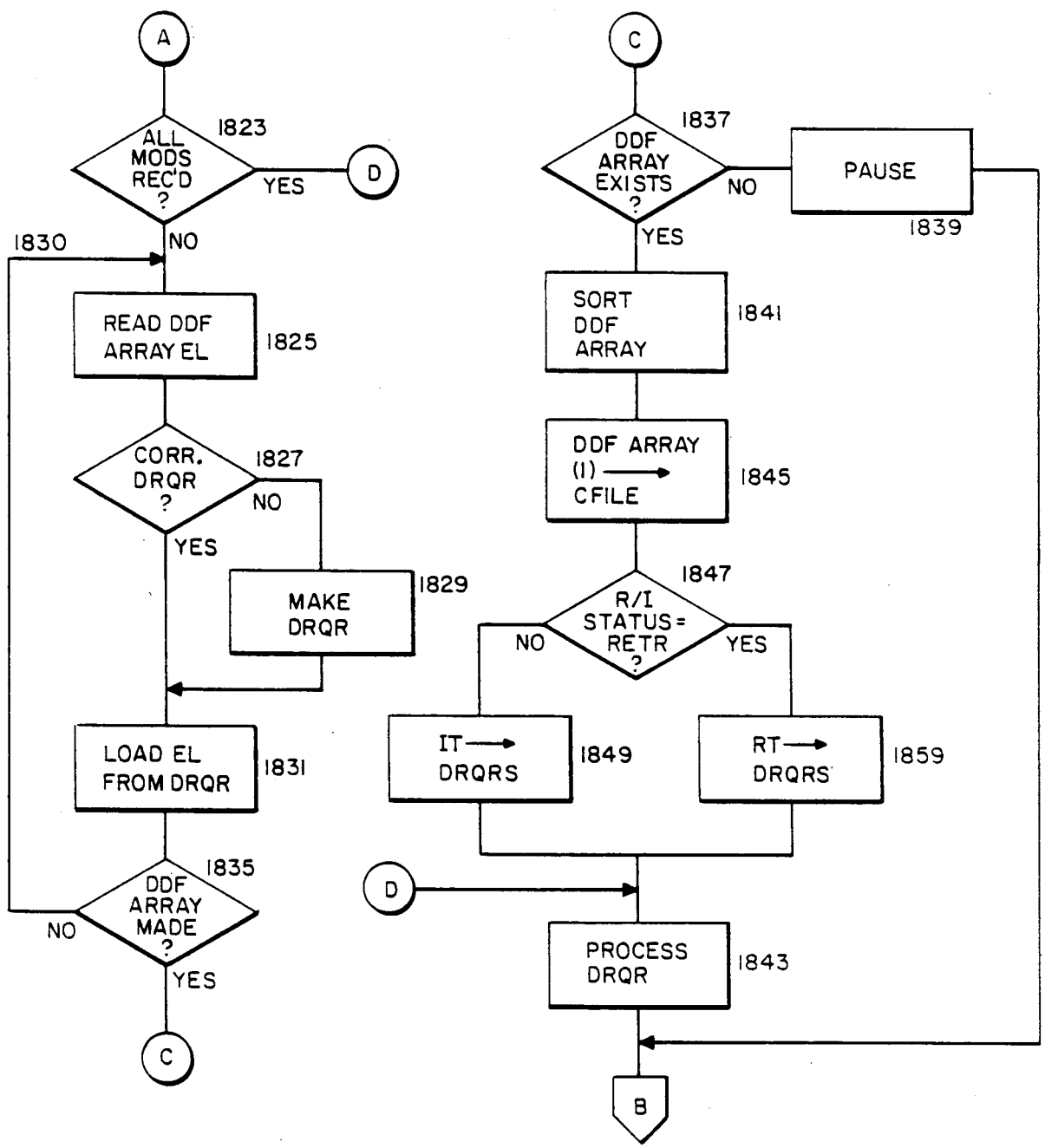

Reference numbers in the figures have three or more digits. The two least significant digits are reference numbers within a drawing; the more significant digits are the drawing number. For example, the reference number 1401 refers to item 1 in FIG. 14.

DESCRIPTION OF A PREFERRED EMBODIMENT

The following description of a preferred embodiment first presents conceptual overviews of the present invention and of certain configurations thereof. Then it presents a description of an implementation of the invention made using code written in the COBOL language, compiled, and executed in VS computer systems manufactured by Wang Laboratories, Inc. As will be clear to those skilled in the art, the implementation using COBOL in the VS computer system is purely exemplary; the invention is in no way restricted to implementation in the COBOL language in the VS computer system and may be practiced using any programming language and any computer system.

1. Overview of Data Distribution Apparatus 301: FIGS. 3 and 3A

FIG. 3 is a conceptual block diagram of the present invention, data distribution apparatus (DDA) 301. DDA 301 has five components: distributor (DIST) 303, data descriptor (DD) 305, retriever (RETR) 307, data source (S) 309, and data destination (D) 311. DIST 303 and RETR 307 may be special apparatus or one or more computer systems executing programs. S 309 and D 311 are data storage devices or media which are accessible to RETR 307. DD 305 describes data in S 309 which is to be retrieved therefrom by RETR 307 and stored in D 311. The apparatus operates as follows: DIST 303 produces DD 305. RETR 307 receives DD 305 and responds to it by transferring the described data from S 309 to D 311. DD 305 may be communicated between DIST 303 and RETR 307 by a physical connection between the two, by a network connecting the two, or by means of media. In the latter case, DIST 303 writes DD 305 onto the media, the media are transported to RETR 307, and RETR 307 reads DD 305 from the media.

DD 305 is shown in conceptual detail in FIG. 3A. DD 305 is a data structure which must contain data identifier (DID) 313, which identifies the data to be distributed from S 309 to D 311, and may also contain destination operation descriptor (DOD) 315, which contains information used by RETR 307 to perform various operations connected with retrieving the data to be distributed and storing it in D 311. Depending on how the system is configured in which DDA 301 is used, DID 313 may contain information identifying S 309 as well as the data contained therein and DOD 315 may contain information identifying a particular portion of D 311. Only DID 313 is required for RETR 307 to successfully distribute data from S 309 to D 311, but the addition of DOD 315 to DD 305 greatly increases the flexibility and efficiency of operation of the present invention.

2. DDA 301 in Systems which Distribute Data via Media: FIG. 4

FIG. 4 shows one way in which DDA 301 may be employed to distribute data via media. As previously mentioned, S 309 may be media, and DD 305 may also be sent on media from DIST 303 to RETR 307. It is often advantageous to place the data to be distributed and DD 305 on the same media, producing media 401, containing both DD 305 and S 309. In a system in which this is done, DIST 303 will have access to media writer (MW) 405, which may be a tape drive, a disk drive, or the like which can write the selected medium, and RETR 307 will have access to media reader (MR) 407. which can read the media written by MW 405. The operation of the system of FIG. 4 is straightforward: DIST 303 writes DD 305 and the data to be distributed to media 401, media 401 is transported to RETR 307, and RETR 307 first reads DD 305 and then uses the information in DD 305 to retrieve the data from Media 401 and then install it in D 311.

3. DDA 301 in a Distributed Data Processing System: FIG. 5

DDA 301 may also be employed in a distributed data processing system, i.e., a system consisting of several component computer systems. DDA 301 in a distributed data processing system is shown in FIG. 5. Distributed System 501 contains a number of component computer systems 502 which are connected by a data transfer means (DTM(a)) 511 such as a network. One of the component systems is host 509, which serves only to store the data being distributed. That data is labelled SD 513 in FIG. 5. Another of the component systems is further connected by another DTM(b) 511 to other components 502. It is to be understood that distributed system 501 is purely exemplary and that DDA 301 may be employed in systems 501 containing more or fewer components and having different configurations.

When DDA 301 is implemented in system 501, component systems 502 may function as DISTs 303. RETRs 307, or as both DISTs 303 and RETRs 307. Any system which functions as a DIST 303 is termed a central system (CS) 503; any system which functions as a RETR 307 is termed a remote system (RS) 505; a system which functions as both is termed a central-remote system (CRS) 507. Further, storage accessible to component systems 502 may serve as a D 311 for one data transfer and a S 309 for another. For example. RETR 307 in CRS 507 may receive a DD 305 from a different CS 503 via DTM(a) 511 and respond thereto by transferring data from Host 509 to storage accessible to the CRS 507. For that transfer, consequently, the storage functions as D 311. Thereupon, DIST 303 may provide a DD 305 via DTM(b) 511 to another component 502, and RETR 307 in that component may respond to the new DD 305 by transferring the data from the storage accessible to the CRS 507 to another D 311. Thus, for the second transfer, the storage accessible to CRS 507 functions as a S 309.

DDA 301 in system 501 functions as follows: a given DIST 303 in system 501 produced DD 305 describing the data to be transferred and transfers DD 305 via DTM 511 to a RETR 307 having access to both S 309 containing the data and D 311 to which it is to be transferred. RETR 307 received DD 305 and using the information contained in DD 305, employs DTM 511 to transfer the designated data from S 309 to D 311. In system 501, DD 305 may specify data accessible directly from a CS 503 or accessible from a host 509.

If DIST 503 and RETR 307 are both in the same CRS 507, the DD 305 created by DIST 303 may be used by RETR 307 in that same CRS 507. One situation in which this may occur is when CRS 507 obtains data from SD 513 for further distribution via a DTM 511 connected to CRS 507. In that case, DIST 303 creates a first DD 305 which is responded to by RETR 307 to transfer the data from host 509 to CRS 507 and then creates additional DDs 305 which are sent to the components 502 connected to DTM(b) 511.

In a second case, the transfer may not involve DTM 511, but may be a purely local transfer from S 309 accessible to CRS 507 to D 311 accessible to CRS 507. In that case, DIST 303 simply makes DD 305 and provides it to RETR 307 in the same CRS 507, which then performs the transfer from the local S 309 to the local D 311. System 501 may also contain component systems (not shown) which are not connected to DTM 511, but to and from which data is transferred in the manner described for DDA 301 in a system using media. Thus, in system 501, DDA 301 may be used to distribute data using DTM 511 or media from a CS 503 or a host 509 to a RS 505 or to distribute data locally within a CRS 507. Further, any component system 502 including a DIST 303 may provide a DD 305 to any component system 502 including a RETR 307. Host 509 is thus merely optional and is not a required component of System 501.

4. The Computer System used to Implement DIST 303 and RETR 307 in a Preferred Embodiment: FIG. 6

In a preferred embodiment, DDA 301 is implemented in a distributed system 501 whose component systems 502 are VS computer systems manufactured by Wang Laboratories, Inc. FIG. 6 is a block diagram of VS computer system 601. The system consists of CPU 605 and a group of I/O processors (IOPs) 607 which are connected to a common bus 604, which in turn is connected to memory 603. Both CPU 605 and IOPs 607 have direct access to memory 603 via bus 604. IOPs 607 are further connected to a variety of devices for storing, sending, or receiving data. In the typical configuration of system 601, one IOP 607 is connected to a disk controller (DC) 609 which is further connected to disks 617, another is connected to Media Interface (MI) 611, which is a device such as a tape drive or a floppy disk drive, and a third is connected to Network Interface (NI) 613, which in turn is connected to NET 615, which functions in the preferred embodiment as DTM 511. NET 615 in a present embodiment may be a network such as Wang Laboratories, Inc.'s WANGNET or IBM Corporation's SNA.

Files containing data to be operated on by system 601 are stored on disks 617. Disks 617 are logically subdivided into volumes 619, which in turn are logically subdivided into libraries 621, to which the individual files 623 belong. Each file in VS system 601 is uniquely identified by specifying a pathname which consists of the file's name, the name of the library to which it belongs, and the name of the volume to which the library belongs. A file 623 is moved from one volume to another by physically copying it from the first volume to the second volume, but may be placed in a different library simply by changing the library name in the file's pathname.

Operation of system 601 is conventional. VS system 601's operating system loads an executable file 623 containing instructions into memory 603 and CPU 605 begins executing the instructions in the executable file. Some of those instructions specify I/O operations, and in response to those instructions and data in memory 603, IOPs 607 read data from or output data to the I/O or storage devices to which they are connected. Thus, a program executing on CPU 605 may specify that the contents of a file 623 may be read via IOP 607(a) into memory 603, combined with the proper protocols for transfer via NET 615, and then written via IOP 607(n) to NI 613, which sends the contents of file 623 over NET 615.

5. Overview of Preferred Embodiment of DDA 301: FIG. 7

FIG. 7 is a block diagram of DDA 301 embodied in a distributed system with component systems including a host 509 having an IBM 360/370 architecture and computer systems 601 which function as DISTs 303 and RETRs 307 and provide storage for S 309 and D 311. The component systems are connected via net 615(a). One of the component systems, CRS 507, is further connected to other systems 601 via net 615(b). Host system 509 includes inventory library (IL) 707 which contains data to be distributed to RSs 505 and to CSs 503 for further distribution to other component systems. The data is stored as files, and DD 305 is implemented in a file. Consequently, net 615 is required only to be able to transfer files between the component systems.

CRS 507 in the preferred embodiment includes three groups of components relevant to DDA 301:

Store components (SC) 703, the program and data files necessary to implement S 309 for CRS 507;

Distribution components (DISTC) 705, the program and data files necessary to implement DIST 303 for CRS 507;

Retrieve components (RETRC) 711, the program and data files necessary to implement RETR 307 for CRS 507.

Destination components (DC) 709, the program and data files necessary to implement D 311 for CRS 507;

RS 505 contains two sets of components:

Destination components (DC) 709, the program and data files necessary to implement D 311 for RS 505;

Retrieve components (RETRC) 711

In a preferred embodiment, the program files are object files produced by compilation of source files written in the COBOL language. However, the program files may be produced by compilation from other high level languages, by assembling code written in assembly languages, or by interpreting high level code. The invention is in no way dependent on the kind of high level code used or whether the code is executed directly on CPU 605 or is interpreted by an interpreter executing on CPU 605.

Operation of the system of FIG. 7 is similar to that of system 501: DISTC 705 in CRS 507 produces DDs 305 which it provides to RETRCs 711 in CRS 507, RS 505, or other systems 601 connected to nets 615(a) or 615(b). Depending on the contents of DD 305, CRS 507 and RS 505 may retrieve data from either IL 707 in host 509 or the S 309 implemented by SC 703; systems connected to net 615(b) may retrieve data from CRS 507. Data retrieved by CRS 507 is stored in the S 309 implemented by SC 703 for further distribution; data retrieved by RS 505 is stored in D 311 implemented by DC 709.

6. SC 703: FIGS. 8 and 9

The components of SC 703 in a preferred embodiment are shown in FIG. 8. The components consist of files 623 and libraries 621 stored on disks 617 of system 601 in which S 309 is implemented. Beginning with SDSCOF 801, SDSCOF is a program file containing routines including source manipulation programs (SMP) 802. When the routines in SMP are executed by CPU 605. S 309 is created and manipulated as required for operation of CRS 507. SMP 802 in a preferred embodiment is an interactive program which employs menus to obtain the information required to set up S 309 from a user of system 601. The menus used in the interaction with the user are contained in the program data file SCRNFI 819. SMP 802 further assigns certain default properties to S 309 unless the user specifies otherwise. These properties are defined in DEFFI 817. S 309 itself is implemented by means of two libraries 621 created and maintained by SMP 802. The first of these is Inventory Library (IL) 707. IL 707 may be on the same component system as the remainder of SC 703 or may be on Host 509, with the remainder of SC 703 on the component system. The data to be transferred to other systems 601 by DDA 301 is contained in data files 831 in IL 707. In a present embodiment, the data files contain software. Data files 831 are identified by means of unique identifiers.

The second library 621 is inventory directory library (IDL) 803. IDL 803 organizes data files 831 in IL 707 into software packages. Each package contains one or more groups, and each group contains one or more modules. Each module corresponds to one of the data files 831 in IL 707. A group of modules is a set of modules which, when installed in a RS 505, must all reside on the same volume 619.

IDL 803 contains four indexed files: package file (PF) 805, group file (GF) 809, module file (MF) 813, and identifier file (IDF) 829. IDF 829 contains records which relate the unique identifiers for data files 831 in IL 707 to alphanumeric names for the files. The use of IDF 829 to relate a file's unique identifier to an alphanumeric name for the file permits storage of more than one version of a file with a given alphanumeric name in data files 831. The remaining indexed files contain records identifying the packages whose modules are stored in data files 831. PF 805 contains one package file record (PFR) 807 for each package having files in IL 707. GF 809 contains one group file record (GFR) 811 for each group having files in IL 707, and MF 813 contains one module file record (MFR) 815 for each data file in data files 831. Details of PFR 807, GFR 811, and MFR 815 are shown in FIG. 9.

PFR 807 contains two main parts: package key (PKG KEY) 901 and package installation information (PKGII) 909. As an indexed record, PFR 807 may be accessed by the information contained in PKG KEY 901. In a present embodiment, that information includes the following:
  package production/test indicator (PKG P/T) 903, which in IDL 803 always is set to test;
  PKG NAME 905, which contains the name of the package;
  PKG REL NO 907, which contains the release number of the package.

PKG KEY 901 thus permits retrieval of information about a package by the package's name, by its release number, and by its status as a production or test package. PKGII 909 contains information required by RS 505 to install the package. Included in that information are three fields of particular interest: UPDATE REL 908, PFRCS 910, and PKG STATUS 912. UPDATE REL 908 indicates whether the package contains updates of a previously-distributed package or is a new or replacement package. PFRCS 910 is a checksum which permits determination of whether any of the modules in the package represented by PFR 807 has been modified. PKG STATUS 912 indicates whether the package is installed or not. In IDL 803, it always indicates that the package is not installed. PKGII 909 in IDL 803 further specifies the size of the package, whether it has been locked or unlocked, and when, where, and by whom it has been distributed.

As may be seen from FIG. 9, GFR 811 and MFR 815 are generally similar to PFR 807. In GFR 811, GRP KEY 911 contains PKG NAME 915 and PKG RELNO 917 of the package the group represented by GFR 811 belongs to, GRP P/T 915, indicating whether the group is a production or test group, and GRP NAME 919, which is the name of the group represented by GFR 811. GRPII 921 contains group installation information similar to the information in PKGII 909, including GRPRCS 920, which indicates whether any of the modules in the group represented by GFR 811 have been modified. In MFR 815, MOD KEY 923 contains MOD P/T 925, indicating whether the module is a production or test module and fields 927 through 933 containing the package name, package release number, group name, and module name. MOD II 941 contains module installation information. Included in that information are protection information (PROTD 943), MFRCS 942, and MOD RL 947. PROTD 943 describes how the module represented by MFR 815 may be accessed when installed. MFRCS 942 permits checking to determine whether the file containing the module represented by MFR 815 has been modified. In a preferred embodiment, MFRCS 942 contains a value generated from the sequence of bits in the file. GRPRCS 920 is computed by XORing all of the MFRCS 942 for the modules belonging to the group, and PFRCS 910 is computed by XORing all of the GRPRCS 920 for the groups belonging to the package. MOD RL 947 has no function in PFRs 807 in IDLs 803, but is used when a module is installed in RS 505 or CRS 507 to specify the library in which it is installed.

In addition, MFR 815 contains file info 935, by means of which file 623 containing the module represented by MFR 815 may be located. In a preferred embodiment, file info 935 includes MOD ID 937, which is the ID number used in IL 707 for the file 623 represented by MFR 815, IL ID 939, which specifies IL 707, and VOL ID 940. which specifies the volume 619 in which IL 707 is located.

The arrangement of keys in PFR 807, GFR 811, and MFR 815 permit easy location of the components of a given software package. If a package's name or release number is known, that information may be used to locate the GFRs 811 for the groups belonging to the package and the MFRs 815 for the modules. The MFRs 815 in turn permit location of the files containing the modules in IL 707. Similarly, if the name of a group is known, its GFR Bll may be located, and from the GFR 811, the PFR 807 for its package and the MFRs 815 for its modules and if the name of a module is known, its MFR may be located and from that, the GFR 811 for the group and the PFR 807 for the package.

7. DISTC 709: FIGS. 8, 10, 11, and 12

DISTC 709 in a preferred embodiment consists of data descriptor production routines (DDP) 804 in SDSCOF 801, outgoing data descriptor library (DDOUTL 833), which contains data descriptor files (DDF) 835, a preferred embodiment of DD 305, and distribution ID File 821, which contains unique identifiers assigned to DDFs 835 which are placed in DDOUTL 833. The routines in DDP 804 receive information from the user of system 601 concerning one or more packages to be distributed, use that information and information in IDL 803 for the packages to construct a DDF 835 for the packages, and place DDF B35 onto net 615 or into media 401 containing the package modules. The routines in DDP 804 are interactive, and like the routines in SMP 802, use default values from DEFFI 817 and menus from SCRNFI 819.

DDF 835, a preferred embodiment of DD 305, is shown in detail in FIGS. 10 and 11. Each DDF 835 is a single file which represents one or more software packages. The file is an indexed file with four kinds of records: a single DD header record (DDHDR) 1003, a package record (PKGR) 1005 for each package represented by DDF 835, a group record (GRPR) 1007 for each group in the packages, and a module record (MDR) 1009 for each module in the packages. PKGR 1005, GRPR 1007, and MDR 1009 each contain substantially the same information as PFR 807 for the package, GFR 811 for the group, and MFR 815 for the module respectively. In particular, MDR 1009 contains a copy of FILE INFO 935 from MFR 815. Thus, DDF 835 is effectively a copy of the information in IDL 803 for each of the packages represented by DDF 835 combined with DDHDR 1003, which contains the information required for the actual distribution.

Beginning with the information about the packages, in a preferred embodiment, PKGRs 1005 for all of the packages are grouped together, followed by GRPRs 1007 for all of the groups, followed by MDRs 1009 for all of the modules. The GRPRs 1007 and MDRs 1009 for a given package in a DDF 835 may correspond to all or any part of the groups and modules for the package specified in IDL 803. This property permits DDF 835 to be used to distribute partial revisions of existing packages as well as complete revisions and new packages. Since only those files needed for the partial revision are specified in the DDF 835, only those files are fetched from IL 707.

DDHDR 1003 is illustrated in detail in FIG. 11. The information in DDHDR 1003 may be divided into five groups of fields:
DDHDRKEY 1101 is the key by which DDHDR 1003 may be accessed;
DIST INFO 1112 contains information regarding the distribution of DDF 835 to RS 505;
RETR TIME 1120 specifies the time at which RETR 307 in RS 505 should retrieve the packages represented by DDF 835;
INST TIME 1124 generally contains installation information relevant to the installation of the packages in RS 505;
RI 1134 generally contains retrieval information required to retrieve the packages from S 309 where they are stored. Beginning with DDHDRKEY 1101, each of the other records in DDF 835 contains a similar key. In these keys, RECTY 1103 indicates whether the record is a DDHDR 1003, a PKGR 1005, a GRPR 1007, or a MDR 1009. Fields 1105 through 1109 are filled out to the degree required for the kind of record. Thus, in DDHDR 1003, only RECTY 1103 is filled out.

DIST INFO 1112 contains information about the distribution of DDF 835 to RS 505 which receives DDF 835. DISTD 1113 indicates the date of distribution, DISTIDIN 1115 is a unique identifier given to DDF 835 by DDP 804 when it creates the file, and DISTIDOUT 1117 is a unique identifier given to DDF 835 when it is received at RSs 505. NO PKG 1119 specifies the number of packages represented by DDF 835. RETR TIME 1120 consists of fields 1121, which specifies the date upon which RS 505 is to retrieve the packages represented by DDF 835, and 1123, which specifies the time of day of retrieval. INST TIME 1124 contains fields 1125 and 27, specifying the date and time of day has the value 99:99, the packages will not be installed at RS 505. In a present embodiment, if the time of day has the value 99:99, the packages will not be automatically installed, but may instead be installed by the operator of RS 505. RI 1134 includes TRANS T 1129, which is an estimate of the time it will take to transfer the packages represented by DD 835 to RS 505. CONFR 1131, which specifies what actions are to be taken when a package with the same name as the one being retrieved already exists in the D 311 to which the packages are being retrieved, and SS flag 1133, which is used to indicate whether the transferred files may be deleted after copies of them have been made in D 311.

Further, L/R 1135 specifies whether the files are to be obtained locally or remotely and whether distribution is to be to an IL 707 or a holding library at a CRS 507 or an RS 505. When DDF 835 specifies retrieval from a host system 509, SID 1137 identifies the host system 509. OID 1139 identifies the CRS 507 which created the DDF 835 and from which the packages may be retrieved if there is no host 509 specified, and RID 1141 specifies the destination system CRS 507 or RS 503. Other information in DDHDR 1003 is not relevant to the present invention and will not be further described.

8. Operation of DDP 804: FIGS. 12–14

Operation of DDP 804 to produce DDF 835 for one or more packages is shown in the flowcharts of FIGS. 12–14. FIG. 12 presents an overview of the program. The program is a loop which continues producing DDFs 835 until the user of DDP B04 indicates he is finished. The first step, shown in box 1201, is to initialize. This involves opening DEFFI 817, SCRNFI 819, DISTID FI 821, IDL 803, and DDOUTL 833 and initializing using default values from DEFFI 817. The first steps in the loop involve getting the data from DISTC 709 and the user required to construct and send a given DDF 835. In a present embodiment, data from the user is obtained by presenting him with menu screens from SCRNFI 819. The user specifies the data by selecting items from the screens or filling in fields on the screens. Default choices for items and values for fields are provided from DEFFI 817.

As shown in blocks 1206 and 1207 of the flowchart, there are two general categories of data: that required for the distribution of the DDF 835 and that required to fill in DDHDR 1003. The distribution data collected in block 1206 includes values provided by DDP 804 and the user. DDP 804 provides a unique identifier for the distribution which is stored in DISTIDFI 821 and later in DISTIDIN field 1115 of DDHDR 1003. The user fills in menus to provide the name of the package to be distributed, whether it is an update package, how the package is to be distributed, i.e., by net 615, locally, or by media, and the RS 505s to which DDF 835 is to be distributed. The DDHDR data collected in block 1207 includes the contents of RETR TIME 1120. INST TIME 1124, and RI 1134. Where the user does not provide a value, DDP 804 employs a default value. Next, in block 1209, the program checks the received data for validity and consistency. For example, it checks the fields which specify times and dates to make sure that the times and dates are possible times and dates and checks CONFR 1131 to verify that the conflicat resolution specified agrees with the other information collected for DDHDR 1003. If the collected data is invalid, the user is notified of the error and if he wishes to continue, steps 1206 and 1207 are repeated. If it is valid, the program proceeds to step 1211, in which it makes DDF 835 in DDOUTL 833. When DDF 835 is finished, the program sends DDF 835 in the manner specified by the user in block 1206 (block 1213). After DDF 835 has been sent. DDP 804 returns to decision block 1203 to begin preparation of the next DDF 835. When the user is finished, decision block 1203 transfers control to block 1205, which closes the files opened at the beginning of the program and performs other actions necessary to end execution of DDP 804

Continuing with the detailed flowchart of block 1211 in FIG. 13, the processing in that block is done a package at a time. First, the file containing DDF 835 is opened (block 1301). Then, for each package to be distributed, a PKGR 1005 is made from the corresponding PFR 807 in IDL 803 (loop 1302, blocks 1303. 1307, 1309), GRPRs 1007 are made from the corresponding GFRs 811 (loop 1308, blocks 1309, 1311. 1313). and MDRs 1009 from the corresponding MFRs 815 (loop 1312, blocks 1313 and 1315). Whenever a PKGR 1005, GRPR 1007, or MDR 1009 is made, the checksum for the package, group, or module represented by the record is recomputed and compared with the value in PFRCS 910, GRPRCS 920, or MFRCS 942 respectively. If the newly-computed value and the value in the field are different, an error message is generated. When the packages are complete, DDHDR 1003 is made from the information collected from the user (blocks 1303, 1305). As previously explained, location of the necessary PFR 807, GFRs 811, and MFRs 815 from IDL 803 is simplified by the information in the keys of those records.

FIG. 14, finally, shows in detail the processing performed in block 1213. In a preferred embodiment, the user may in step 1206 select among two different kinds of network transfer of DDF 835, transfer via media, and local transfer in the component system 502 which produced DDF 835. If the user specified one of the network transfer types, decision box 1401 transfers control to boxes 1403 and 1405, in which the specified network type is selected and DDF 835 sent via that network type to a library 621 called data descriptor in library (DDINL) on the specified RS 505. If the user specifies a non-network transfer, decision block 1401 transfers control to decision block 1407. If transfer via media was selected, DDF 835 is copied in block 1409 to a file which will later be copied to the media together with the module files for the package; if local transfer was selected, DDF 835 is copied to DDINL on the system which produced DDF 835.

9. DC 709: FIG. 15

The components of DC 709, which implements D 311 in a preferred embodiment, are shown in FIG. 15. The components of DC 709 are generally parallel to those of SC 703, and like them, consist of program and data files 623 stored on disks 617 of a VS system 601 serving as a RS 505. Beginning with destination manipulation program (DMP) 1501, when routines in DMP 1501 are executed by CPU 605, D 311 is created and manipulated as required for operation of RS 505. DMP 1501 in the preferred embodiment is an interactive program which employs menus to obtain the information required to set up and manipulate D 311. Among the operations which an operator may perform interactively using DMP 1501 are manual installation of retrieved software so that it can be executed in RS 505, removal of installed software so that it can no longer be executed, and swapping, in which the status of selected software is changed from experimental software to production software. The menus used in the interaction with the user are contained in the program data file SCRNFI 819. SMP 802 further assigns certain default properties to D 311 unless the user specifies otherwise. These properties are defined in DEFFI 1503.

D 311 itself is implemented by means of three libraries 621 created and maintained by DMP 1501. Two of the libraries, holding library (HL) 1513 and run library (RL) 1517, contain copies of the software which D 311 receives from S 309. HL 1513 holds data files 831 for packages which are not currently available for execution on CPU 605 of RS 505, and is structured in the same fashion as IL 707 in SC 703. Each data file 831 in HL 1513 is identified by means of a unique identifier. RL 1513 holds data files 831 for packages which are currently available for execution on CPU 605. Files in RL 1517 are identified solely by means of their alphanumeric names, since VS system 601 uses such names to locate and execute programs. In a preferred embodiment, each separate volume 619 in VS system 601 embodying CRS 507 or RS 505 must have its own HL 1513, and there may be several RLs 1517 for a given HL 1513.

When the files 623 making up the modules of a software package are retrieved from S 309, they are first placed in HL 1513. They may then be installed by placing them in RL 1517 instead of HL 1513. As previously explained, in a preferred embodiment, a file 623 is placed in a different library by changing the file 623's pathname to include the new library's name. In a preferred embodiment, the unique identifier used for the file 623's name in HL 1513 is further replaced by the file's alphanumeric name (obtained from MOD NAME 933) when the file is placed in RL 1517. The operation of changing the file 623's pathname when it is placed in RL 1517 from HL 1513 or vice-versa is termed hereinafter renaming. Installation may be either automatic or manual, as specified by DDF 835. When DDF 835 specifies automatic installation of the software. INST TIME 1124 of DDHDR 1003 indicates the time of installation, and when that time is reached, the software is automatically placed in RL 1517 instead of HL 1513. When DDF 835 does not specify automatic installation, the retrieved software is held in HL 1513 until an operator employs DMP 1501 to install the software in RL 1517. Removal is the opposite of installation and is performed by placing the module files for a package in HL 1513 instead of RL 1517. The use of HL 1513 and RL 1517 in a preferred embodiment of RS 505 thus makes it possible to separate the operations of retrieval and installation. Since the operations are separable, users of a preferred embodiment of DDA 301 may specify that the software be automatically installed when it is retrieved, that it be automatically installed at a later time, or that it be manually installed by an operator of RS 505. Further, because HL 1513 is structured in the same fashion as IL 707, HL 1513 may function as an IL 707 for other RSs 505.

The third library 621, live directory library (LDL) 1507, organizes the data files 831 in HL 1513 and RL 1517 into software packages. LDL 1507 is structured in the same fashion as IDL 803: it contains three files, PF 805, containing a PFR 807 for each software package with files 831 in HL 1513 or RL 1517, GF 809, containing a GFR 811 for each group with files 831 in HL 1513 or RL 1517, and MF 813, containing a MFR 815 for each file 831 in HL 1513 or RL 1517. In LDL 1507, PKG STATUS 912, GRP STATUS 922, and MOD STATUS 945 respectively indicate whether the package, group, or module corresponding to the record is installed or not. Where copies of a file 831 are actually located is determined by the fields in FILE INFO 935, MOD RL field 947, and the MOD NAME field in MOD KEY 923 of MFR 815. MOD ID field 937 contains the unique identifier for the file. Field 939 contains the library identifier for HL 1513 and VOL ID field 940 the volume 619 upon which HL 1513 and RL 1517 are located. MOD RL field 947 contains the library identifier for RL 1517 when the file 623 containing the module represented by MFR 815 is installed.

Logically, LDL 1507 appears as two directories, a production directory (PROD) 1509 for production software and a test directory (TEST) 1511 for test software. LDL 1507 is divided into the two directories in order to permit persons distributing software to HL 1513 and persons using the software in HL 1513 to categorize the software in terms of its relative reliability. If a user deems a particular package to be more reliable, he may specify that LDL 1507 keep it as production software, if he deems it less reliable, he may specify that LDL 1507 keep it as test software. As will be seen in more detail below, a swap operation is provided to recategorize test software as production software. Initially, all software retrieved to HL 1513 is in the test category.

The division into two logical directories is implemented in a preferred embodiment by means of field 903 in the key of PFR 807, field 913 in the key of GFR 811, and field 925 in the key of MFR 815. In LEL 1506, each of these fields indicates whether the package, group, or module specified by the record is a production or test package, group, or module. As previously mentioned, in IDL 803, these fields all specify that the package, group, or module is a test package, group, or file. Since records in LDL 1507 may be accessed by fields 903, 913, and 925, it is possible to determine which of the packages, groups, and modules are production modules and which are test modules.

There may be two packages in LDL 1507 which have the same name in PKG NAME 905 of their PFRs 807, one of which is a production package and the other of which is a test package. The packages may in turn have groups and modules with identical names. The packages are distinguished in LDL 1507 by PKG P/T field 903 in PFR 807 and its equivalents in the package and module records and by the fact that the files 623 for the modules will have different MOD IDs 937. Such a pair of packages is termed hereinafter a production-test package pair. In a preferred embodiment, only one member of the pair may be installed at any given time. SDSRETR 1601 and DMP 1501 in the preferred embodiment guarantee that this will be so by examining the records in LDL 1507 for the versions and automatically removing the modules of the installed version. A test package becomes a production package by means of the swap operation. The operation may be specified by a setting of CONFR 1131 in DDF 835 and be performed automatically when the package is retrieved or may be performed interactively using DMP 1501. If the test package is not a member of a production package-test package pair, all that is involved in the swap is installing the test package and changing PKG P/T field 903, GRP P/T field 913, and MOD P/T field 925 in the records for the package to specify that the package is a production package.

If the test package is a member of a production package-test package pair, the swap operation requires replacement of the production package by the test package. In order for the operation to take place, the test package member must be installed. The swap is performed by deleting all modules of the production package and the records for the production package in LDL 1507 and setting fields 903. 913, and 925 in the records for the test package in LDL 1507 to indicate that the package is now a production package.

10. RETRC 711: FIGS. 16 and 17

Retrieve components (RETRC) 711 in a preferred embodiment are also data and program files 623 stored on disks 617 of system 601 upon which RS 505 or CRS 507 is implemented. The program files 623 make up the program SDSRETR 1601, which responds to a DDF 835 by making records in LDL 1507 for the packages represented by DDF 835, retrieving the files 623 for the package's modules from the IL 707 specified in DDF 835 to a HL 1513 or an IL 707, and if specified in DDF 835, installs the modules for the package in RL 1517. The data files 623 making up RETRC 711 include data retrieval queue (DRQ) 1603, which contains records indicating files to be retrieved from S 309 and the status of the retrieval and installation operations, data descriptor in library (DDINL) 1613, which is analogous to DDOUTL 833 and contains DDFs 835 which have been received in RS 505, and retrieve ID file (RETRIDFI) 1615, which is analogous to DISTIDFI 821 and similarly provides unique identifiers for the DDFs 835 received in DDINL 1613.

DRQ 1603 actually contains three queues: retrieve queue (RQ) 1605, package queue (PQ) 1607, and install queue (IQ) 1609. The DRQR 1611 records in RQ 1605 represent DDFs 835 for which the operation of retrieving the data specified in DDF 835 from S 309 to HL 1513 is taking place; those in PQ 1607 represent DDFs 835 for which the operation of making PFRs 807, GFRs 811, and MFRs 815 in LDL 1507 is taking place; those in IQ 1609 represent DDFs 835 for which the operation of installation in RL 1517 is taking place. As the data represented by a given DDF 835 moves through the steps of being retrieved, packaged, and installed, DRQR 1611 representing the DDF 835 moves from one queue to another. As will be explained in more detail below, in a preferred embodiment, the movement is logical; the physical position of a given record in DRQ 1603 remains unchanged. In other embodiments, a record may in fact change its position as it moves from queue to queue.

During the course of each operation, status indicators in DRQR 1611 indicate the current status of the operation with regard to the data represented by the DDF 835 to which the DRQR 1611 corresponds. The possible statuses are the following:

retrieve operation:
TOD awaiting date/time specified for retrieve
CHECK DDF 835 being checked for conflicts
ERR-nnnn conflict check failed. nnnn indicates reason
ACTIVE module files specified in DDF 835 being retrieved via net 615
CANCEL operations on DDF 835 being cancelled
CANCELED cancellation complete
package operation:
ACTIVE making PFR 807, GFRs 811, and MFRs 815 for the package in LDL 1507
ERR-nnnn failure while making the records for the package; nnnn indicates the reason
installation operation:
TOD awaiting date/time specified for installation
ACTIVE files specified in DDF 835 being installed in RL 1517
ERR-nnnn failure while installing the package in RL 1517; nnnn indicates the reason
HOLD awaiting installation by user of RS 505
COMPLETE installation complete
CANCEL operations on DDF 835 being cancelled
CANCELLED cancellation complete Within each queue in DRQ 1603, the DRQRs 1611 are ordered by the current status of the operation for the package represented by DDF 835.

In a preferred embodiment, each DRQR 1611 has the fields shown in FIG. 17. There are three major subdivisions of fields: DRQR Key 1701, which is the key by which the record may be accessed in DRQ 1603, queue information (QI) fields 1709, which contains the information required to order DRQR 1611 in DRQ 1603, and retrieval and installation (RII) fields 1719, which contain information concerning the retrieval and installation of files 621 specified in a DDF 835.

Beginning with KEY 1701, MO field 1703 and DAY field 1705 respectively contain the month and the day upon which DRQR 1611 was created. DDFID 1707 contains the unique identifier from RETRIDFI 1615 which was assigned to incoming DDF 835 when DRQR 1611 for incoming DDF 835 was created. QI 1709 contains LU DATE field 1711 and LU TIME field 1713, which specify the last time that the contents of DRQR 1611 were altered. QUEUE 1715 indicates which of the three queues in DRQ 1603 DRQR 1611 presently belongs to and STATUS 1717 indicates which status the package represented by DRQR 1611 presently has. The values of both QUEUE 1715 and STATUS 1717 change as the package represented by DRQR 1611 is processed.

RII 1719 contains the following fields: RETR TOD 1721 and RETR DATE 1723 contain the time and date at which the package represented by DRQR 1611 is to be retrieved; INST TOD 1725 and INST DATE 1729 contain the time and date at which the package is to be installed. The values in these fields come from the values in fields 1121-1127 of DDHDR 1003 in DDF 835 representing the package. Modules received counter (MOD REC CTR) 1731 and modules requested counter (MOD REQ CTR) 1733 indicate respectively how many modules of the packages have been received over net 615 and how many have been requested. NO PKGS 1735 indicates the number of packages specified in DDF 835 represented by DRQR 1611 and TRANS T 1737 specifies the estimated time required to transfer the module files for the package via net 615. The values in these fields come from fields 1119 and 1129 respectively of DDHDR 1003. The values in SKIP/REPL field 1739 indicate actions to be taken by SDSRETR 1601 when certain situations arise in the course of retrieval and installation. This field is set from field 1131 of DDHDR 1003. HOST/CENT field 1741 indicates whether the IL 707 containing the files for the modules represented by DDF 835 is associated with a host 509 or is associated with a CS 503 or a CRS 507. IL/HL field 1743 indicates whether the retrieved software is to be loaded to an IL 707 or an HL 1513. These fields are set from L/R 1135 in DDHDR 1003. DDF NET/MEDIA field 1745 indicates whether the files 623 are to be retrieved via net 615 or from media.

There are three remaining fields: ORIG DDFID 1747 contains the unique identifier assigned to DDF 835 represented by DRQR 1611 when DDF 835 was created in CRS 507; the value is obtained from DISTIDIN 1115 of DDHDR 1003. ORIG NAME 1749 identifies CRS 507; COMPLETE-IND 1751, finally, indicates whether processing of DDF 835 represented by DRQR 1611 is complete. The complete state, CMPT, may be reached because an error during retrieval or installation has made further processing impossible or because all of the processing specified in DDF 835 has in fact been completed.

11. Overview of Operation of RETRC 711: FIGS. 18–18A

In a preferred embodiment, the programs of SDSRETR 1601 operate on DRQ 1603, DDINL 1613, LDL 1507, HL 1513, and RL 1517. The programs are executed by a background task on system 601, i.e., by a task whose execution does not require intervention of users of system 601 and which can thus execute at times when CPU 605 is not engaged in executing tasks requiring response to users of system 601. In other embodiments, the programs of SDSRETR 1601 may be executed by a separate process having the same property or may be executed interactively. In the following, the operation of RETRC 711 is explained using flowcharts of SDSRETR 1601, beginning with a high-level flowchart of the program and continuing with detailed flowcharts of certain blocks of the high-level flowchart.

FIGS. 18 and 18A together make up a high-level flow chart of the processing executed by the programs of SDSRETR 1601. The programs are structured as a loop. After initialization, in which a "mailbox" is created whereby the task executing SDSRETR 1601 may receive messages from net 615, the loop continues to execute as a background task until a user of CRS 507 or RS 505 deactivates the program (box 1803). Upon deactivation, the mailbox is deleted and a message sent indicating that the background task executing the program has been deactivated (box 1805). Within the loop, the program first sets the scan period from a value in DEFFI 1503 (box 1809). The scan time is a value which determines the interval between executions of the loop. In other embodiments, there may be no scan time and the loop may be executed in response to an interrupt or inter-process message indicating that an event of interest to the background task has occurred.

Next, the program determines from the number of files in DDINL 1613 whether any DDFs 835 have been added to the library since the last execution of the loop (decision block 1811). If any have been, the program executes a loop which for each new DDF 835 creates an element in an array called DDF array which is used to control DRQ 1603 and then "renames" each new DDF 835. Renaming involves making a new unique identifier for the DDF 835, placing the value in DISTIDIN field 1115 of DDHDR 1003 of the DDF 835, placing the value in DDFID field 1707 of DRQR 1611 for the DDF 835, and placing the value of DISTIDOUT field 1117 of the DDF 835 into the ORIG DDFID field 1747 of DRQR 1611. Renaming gives DDF 835 a unique name in the CRS 507 where it originated and in each of the RSs 505 which retrieved it and makes it possible to track the DDF 835 in both the system in which it originated and those to which it was sent.

The next step (block 1819) is to process DRQ 1603 to update the current status of DRQRs 1611 representing DDFs 835 for which the files specified in the DDF 835 are being retrieved. Loop 1820 which performs the processing continues until all DRQRs 1611 in DRQ 1603 have been examined. If all of the modules specified in any of the DDFs 835 represented by DRQRs 1611 have been retrieved, the program sets an all modules received switch. Continuing with FIG. 18A, the program next checks that switch (decision block 1823). If it is set, the program branches to block 1843; otherwise, the program proceeds to loop 1830, which reads each element of the DDF array (block 1825). For each element of the DDF array, the program determines whether a DRQR 1611 for the DDF array element exists (decision block 1827). If the DRQR 1611 does not exist, it makes the DRQR 1611, filling in the fields of DRQR 1611 from DDHDR 1003 of the DDF 835 corresponding to the array element (block 1829). Thereupon, the fields of the DDF array element are filled in from DDHDR 1003 of DDF 835 and from DRQR 1611 corresponding to DDF 835 (block 1831). The array element has the following fields:

DATE, containing a date
TIME, containing a time of day
RETRIEVE/INSTALL STATUS, indicating whether the modules represented by DDF 835 are being retrieved or installed
DDF DATE, containing the value of DISTD 1113 in DDHDR 1003
DDF ID, containing the value of DISTIDIN field 1115.

RETRIEVE/INSTALL STATUS is set from DRQR 1611's QUEUE field 1715; depending on the value of QUEUE field 1715, DATE and TIME are set from either RETR TOD 1721 and RETR DATE 1723 or INST TOD 1725 and INST DATE 1729 in DRQR 1611. The above steps are performed for each element in the DDF array. When the last element has been processed, the loop terminates (decision block 1835).

Processing continues with decision block 1837, which checks whether the DDF array contains any elements. If it does not, there is no further processing to do and the program pauses in block 1839 until the scan period has elapsed. At that point, execution resumes at block 1803. If the DDF array contains elements, the array is sorted (block 1841). The sort is based primarily on the value of DATE and TIME and secondarily on the values of RETRIEVE/INSTALL STATUS. Thus, at the end of the sort, the elements in the DDF array are ordered so that those with earlier dates and times precede those with later dates and times and if there is a tie with regard to time, those with retrieve status precede those with install status.

After the sort, a variable called CFILE, representing the next DDF 835 to be processed, is set from DDFID in the first element of the sorted array (block 1845). Then a queue status variable, DRQRS, is set from RETRIEVE/INSTALL STATUS in the first element of the sorted DDF array. Depending on the value of RETRIEVE/INSTALL STATUS, DRQRS is set to specify the IT status, indicating installation at the time specified in DATE and TIME, or RT, indicating retrieval at the time specified in DATE and TIME (blocks 1847, 1849, 1851).

The final step in loop 1802 is processing a DRQR 1611. The DRQR 1611 processed will either be one for which all modules have been received or the one which is represented by the first element of the DDF array. In the latter case, if that element is one for which the specified TIME and DATE have already passed, the element is processed; otherwise, the program pauses until either the scan period expires or the specified TIME and DATE is reached, whichever happens first. Execution after the specified TIME and DATE are reached continues at block 1803.

12. Detail of Update DRQR Status Block 1819: FIG. 19

As mentioned above, Update DRQR Status block 1819 is part of loop 1820. Loop 1820 is executed until all DRQRs 1611 in DRQ 1603 have been examined. As shown in FIG. 19, the processing of each DRQR 1611 proceeds as follows: First, the contents of DRQR 1611 to be processed are fetched (block 1901). If STATUS 1717 in DRQR 1611 has the status CANCEL, indicating that the distribution operation represented by DDF 835 has been cancelled by an operator of the destination system CRS 507 or RS 505, the status is changed to CANCELLED (block 1905) and no further processing occurs in block 1819. The setting of STATUS 1717 to CANCEL is performed by a routine in DMP 1501.

If DRQR 1611 being updated did not have the CANCEL status, the program checks the variable DRQRS in block 1907 to determine whether DRQR 1611 is in the RETRIEVE ACTIVE status. This combined status indicates that the files specified in DDF 835 are presently being retrieved from S 309. Any DRQR 1611 which is not in that status receives no further processing in block 1819; a DRQR 1611 which is in that status is processed as follows: first, HL 1513 is checked to determine how many modules represented by DDF 835 corresponding to the DRQR 1611 being processed have already been received in HL 1513. MOD REC CTR 1731 is updated to reflect the number which have arrived (block 1909), and if a comparison between MOD REC CTR 1731 and MOD REQ CTR 1733 indicates that all modules are in, (decision block 1911), DRQRS is set to the PA status, indicating that all of the modules are in and that processing of records for the package in LDL 1507 may begin (block 1913). In this case, DRQR 1611 is not processed further in block 1819. If all modules are not yet in, but COMPLETE IND field 1751 was set to T, indicating that the retrieval is taking longer than the time estimated in TRANST field 1129 of DDHDR 1003, and that a message to that effect has already been sent, DRQR 1611 is not processed further in block 1819 (block 1915). Otherwise, TRANST 1129 is retrieved from DDHDR 1103 (block 1919) and any DRQR 1611 still being processed is checked to see whether the time since the time and date specified in LUDATE field 1711 and LU TIME field 1713 exceeds the estimated transmission time specified in TRANST 1137. If the time does not exceed the estimated transmission time, no further processing takes place in block 1819 (decision block 1919). If it does exceed the estimated transmission time, COMPLETE IND field 1751 is set to T, and an error message indicating the condition is output to an error log (block 1921) and processing in block 1819 is likewise ended.

13. Detail of Process DRQR or Pause Block 1843: FIG. 20

The flowchart of FIG. 20 provides a detailed description of Process DRQR or Pause Block 1843. Processing in block 1843 is determined by whether all modules for the DDR 835 represented by DRQR 1611 have already been received in CRS 507 or RS 505. Whether that was the case was determined in decision block 1911. If all modules have already been received (block 2009), the DRQR 1611 is immediately processed (block 2011). Otherwise, the values of DATE and TIME in the first DDF array element are checked to determine whether it is time to perform either a retrieve or an install operation (block 2013). If it is, the top DRQR 1611 is processed (block 2015); if it is not, there is a pause until either the scan period expires or the time specified in the first DDF array element is reached (block 2017).

Figure 21A:
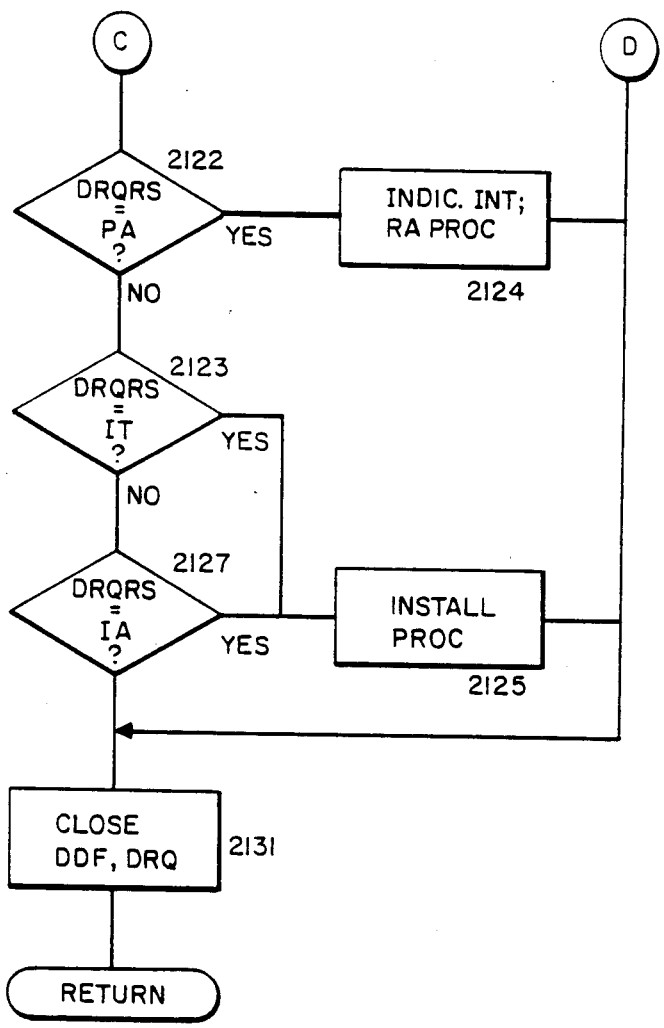

14. Process DRQR 2015 Detail: FIGS. 21 and 21A

In a present embodiment, the processing in Process DRQR 2015 is performed by calling a procedure. The arguments used in the call are the variable DRQRS, indicating the status of the DRQR 1611 being processed and CFILE, which contains DDFID, the identifier for the DDF 835 represented by the DRQR 1611 being processed. FIGS. 21 and 21A are a high-level flowchart of the processing performed by the procedure.

Blocks 2101 through 2109 initialize the procedure. In block 2101, variables are set from DEFFI 1503. Among the variables of interest for the present invention are variables specifying HL 1513, and RL 1517. In block 2103, DDF 835 corresponding to the DRQR 1611 being processed is opened and variables used locally in the procedure are set from the values of fields NO PKG 1119, RETR DATE 1121, RETR TOD 1123, INST DATE 1125, INST TOD 1127, CONFR 1131, SSF 1133, L/R 1135, SID 1137, OID 1139, and RID 1141. Then, if the variable set from L/R 1135 indicates that the modules are to be retrieved to an IL 707, variables in the procedure are set so that IL 707 becomes the destination of the retrieved modules; otherwise, HL 1513 is the destination (blocks 2107, 2109).

The actual processing of the DRQR 1611 occurs in blocks 2111 through 2127. The processing is controlled by the present value of the variable DRQRS. The values of DRQRS may indicate the following statuses:
  RT: retrieve when the time specified in DDF 835 for retrieval arrives.
  RC: check whether the conditions for retrieval are met.
  RA: retrieval currently underway.
  PA: loading of retrieved package into library designated as a destination currently underway.
  IT: awaiting time specified in DDF 835 for installation of package in RL 1517.
  IA: installation currently underway.

DRQRS changes from one of these states to another and the values of QUEUE field 1715 and STATUS field 1717 in DRQR 1611 are changed to specify the state indicated by the new value of DRQRS each time the procedure is executed. Generally speaking, a given DRQR 1611 goes through the states in the order RT, RA. PA, IT, IA. An additional state. RC, is used to indicate an abnormal termination during the transition from RT to RA. Once the RC state is reached, the next state is RA. An error in any of these states terminates processing of the DRQR 1611. When an error occurs, an error flag and an error code indicating the kind of error are set. Completion of processing of DRQR 1611 is indicated by the value of another variable, CMPTS. That variable indicates CMPT, the complete state, when processing in the IA state has been finished and when an error occurs.

Returning to FIG. 21, in decision block 2111, the program tests for the RT state; if DRQRS has that value in an invocation of the procedure, the time specified in RETR DATE 1121 and RETR TOD 1123 of the DRQR 1611 has been reached. The processing necessary to begin the retrieval is carried out in RT processing block 2113. If the processing succeeeds, DRQRS is set to RA; if it is interrupted, DRQRS is set to RC, if there is an error, the error flag and error code are set and and CMPTS is set to CMPT. The program then executes block 2131 (FIG. 21A). which closes the files containing DRQ 1603 and DDF 835, and returns.

If DRQRS does not specify the status RT. the program tests for the status RC (block 2115); if DRQRS does not have that status, the program tests for status RA (block 2119). Continuing in figure 21A, if DRQRS does not have the RA status, the program tests for status PA (block 2122). DRQRS can have the PA status only if RA processing was interrupted, and consequently, the program sets a flag to indicate that fact and again performs the RA processing (block 2124). If DRQRS does not have the PA status, the program tests for the IT status (block 2123), and if DRQRS does not have the IT status, the program tests for the IA status (block 2127). When a status is found, processing for the status is performed (blocks 2117, 2121. 2124. 2125), the value of DRQRS and the fields QUEUE 1715 and STATUS 1717 are set to the next status, or an error is indicated and CMPTS is set to CMPT. and block 2131 is executed as previously described.

15. Detail of RT Processing Block 2113: FIGS. 22-22E

FIGS. 22 through 22E provide a detailed flowchart of processing in RT processing block 2113. Actions taken in that block are determined by the value of the L/R field 1135 and the CONFR field 1131 in DDHDR 1003. When retrieval is to an HL 1513, the actions taken are further determined by whether any corresponding package in HL 1513 is an experimental package or a test package and whether it is presently installed in RL 1517.

Beginning with L/R field 1135, as previously mentioned, the value of that field indicates where the modules in the packages represented by DDF 835 are being retrieved from and whether they will be placed in an IL 707 or an HL 1513. In a preferred embodiment, that field may have the following values:

"H": distribution from a host 509 to an IL 707.
"L": local distribution in a CRS 507 from an IL 707 to an HL 1513.
"N": network distribution to an IL 707.
"R": network distribution to an HL 1513.
"C": distribution via media to an IL 707.
"M": Distribution via media to an HL 1513.

Continuing with CONFR 1131, that field may have two values: "S", and "R". The meanings of the values depend on whether retrieval is to an IL 707 or an HL 1513. With retrieval to an IL 707, the field has meaning only if there is already a PFR 807 in IDL 803 for a package which has the same name and revision number as the package to be retrieved. In that case, "S" means that the package specified in DDF 835 will not be retrieved and "R" means that the package will be retrieved and replace the package specified in the PFR 807.

With retrieval to an HL 1513. CONFR field 1131 has meaning only if the package being retrieved has the same name as one which already has a PFR 807 in LDL 1507. In that case, the meanings of "S" and "R" depend on whether the package represented by PFR 807 is a test package or a production package and on whether it is presently installed or removed. As previously explained, these states are indicated by the fields PKG P/T 903 and PKG STATUS 912 in PFR 807. In a preferred embodiment, there are six combinations. The combinations and the actions taken in response to "S" and "R" are the following:

Both production and test packages with the name, the production package installed and the test package removed: In this case, CONFR field 1131 is ignored, the package specified by DDF 835 is always retrieved, and the retrieved package replaces the test package.

Both production and test packages with the name, the test package installed, and the production package removed: in that case, if CONFR 1131 is set to "S". the package specified in DDF 835 will not be retrieved; if it is set to "R", the package will be retrieved, the current test package will be swapped with the production package, and the retrieved package will become the new test package.

Only an installed production package with the name: in that case, CONFR 1131 is ignored, the package specified in DDF 835 is retrieved, and the retrieved package is placed in HL 1513 as a test package.

Only a removed production package with the name: in that case, if CONFR 1131 is set to "S". the package specified in DDF 835 will not be retrieved; if it is set to "R", the specified package will be retrieved. The production package will be deleted and the retrieved package will remain a test package.

Only an installed test package with the name: in that case, if CONFR 1131 is set to "S", the package specified by DDF 835 will not be retrieved; if it is set to "R", the installed test package will be swapped and the package specified by DDF 835 will become the new test package.

Only a removed test package with the name: in that case. CONFR 1131 is ignored. The package specified by DDF 835 is always retrieved and always replaces the removed test package.

Figure 22A:
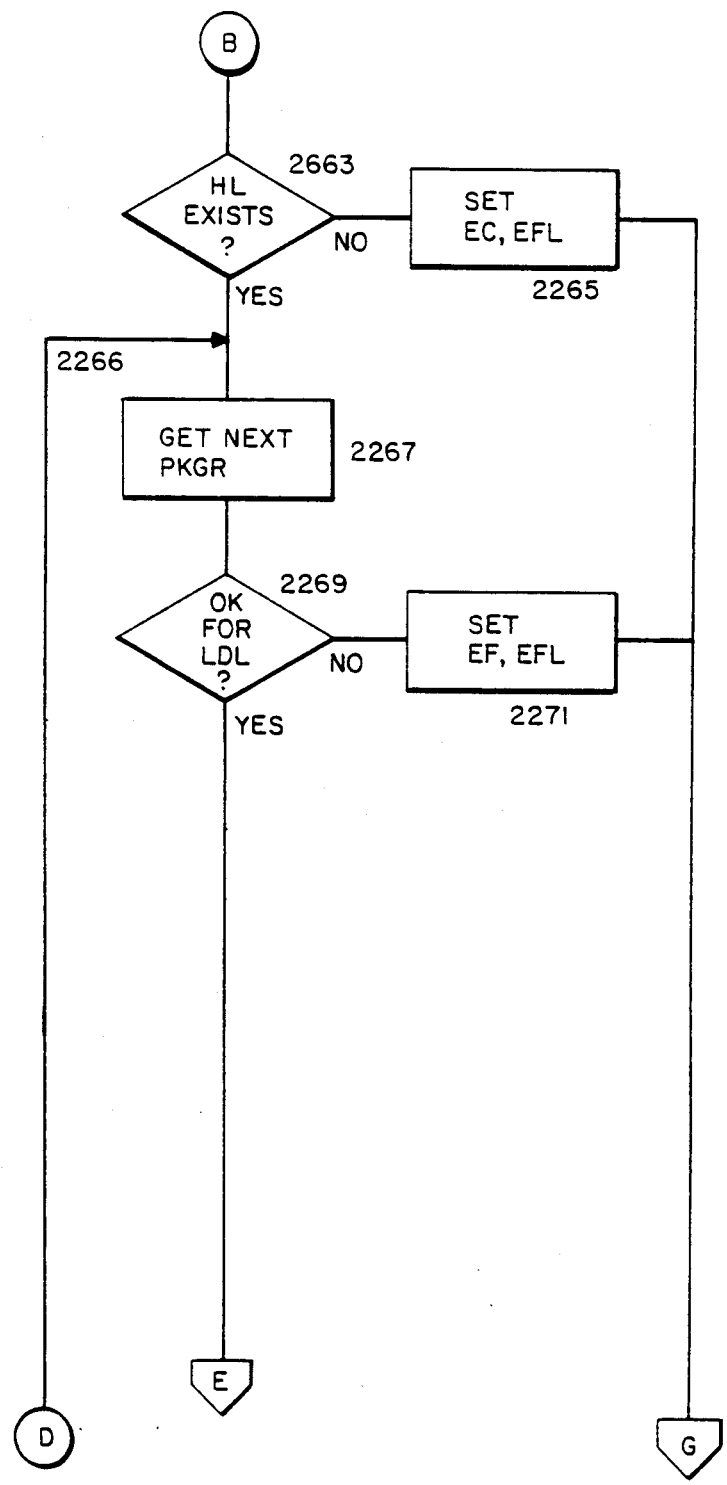
Figure 22B:
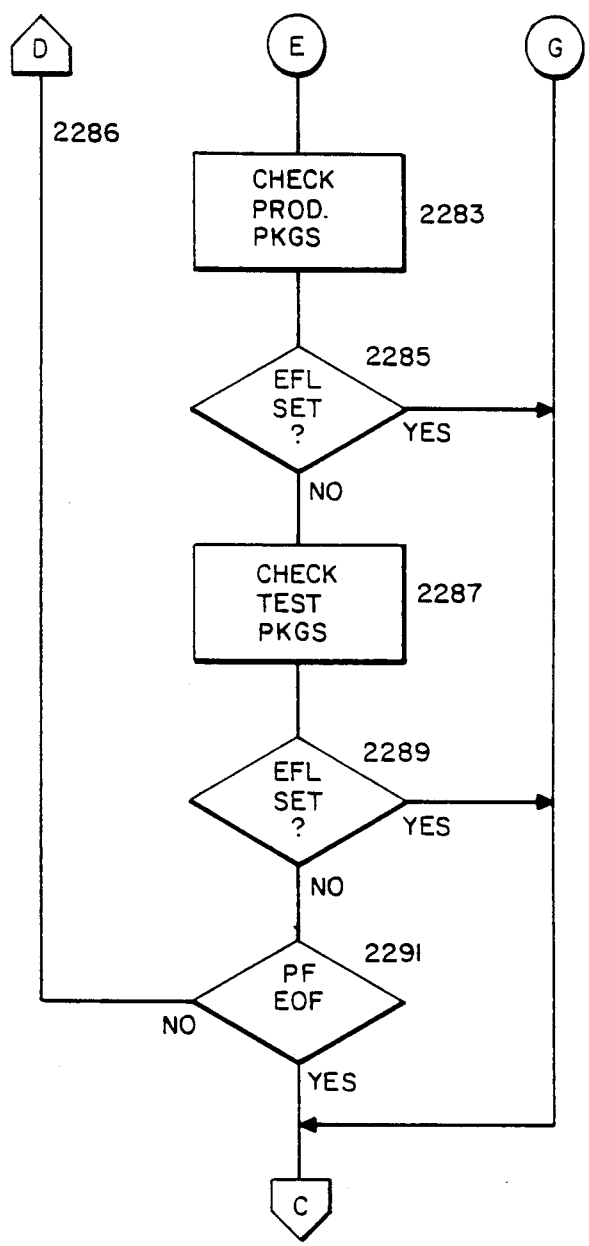
Figure 22E:
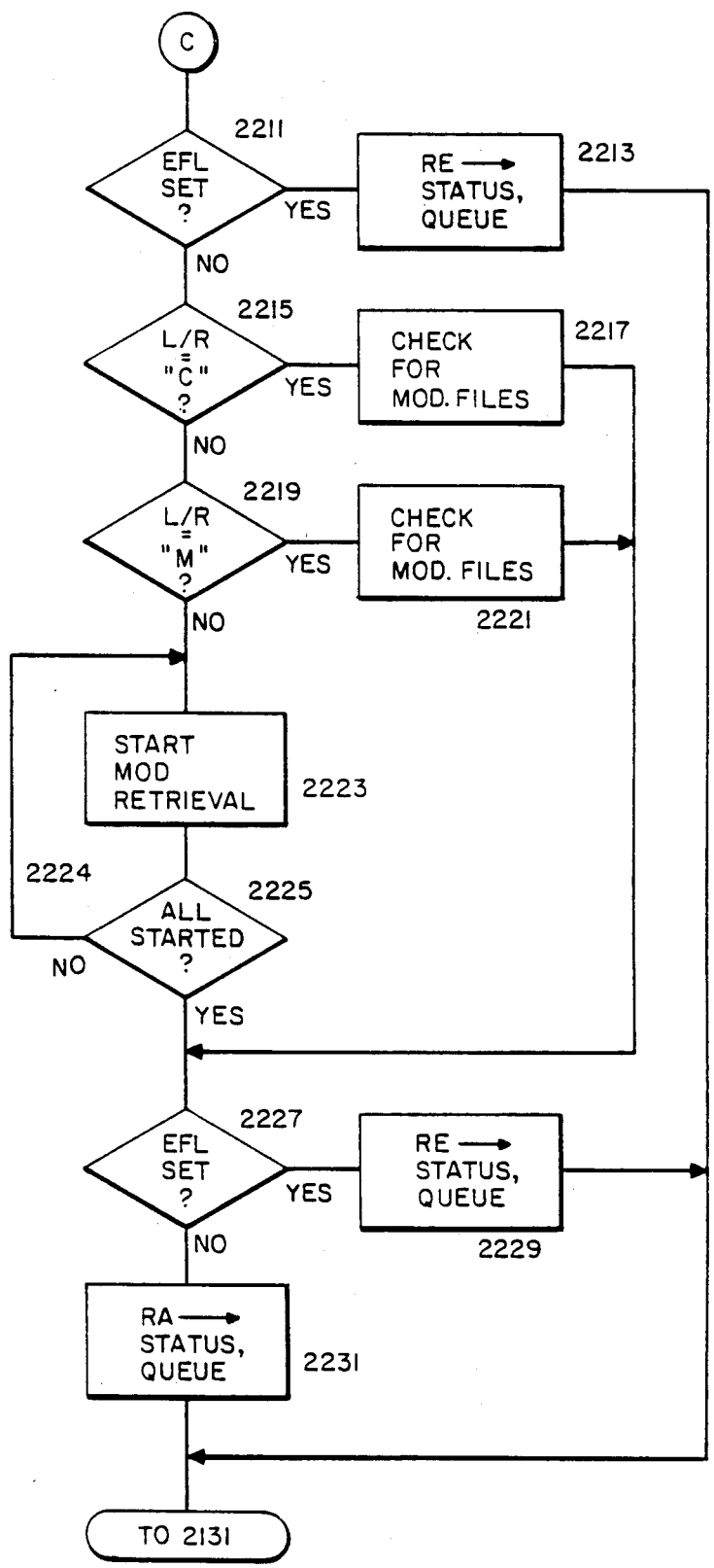

Continuing with the flowchart of FIG. 22, the first step therein is setting STATUS 1717 and QUEUE 1715 in DRQR 1611 to specify the RC status, thereby ensuring that DRQR 1611 will specify that status if the RT processing is abnormally terminated (block 2241). Further processing depends on the value of L/R 1135. If it is "H", indicating distribution from an IL 707 in a host 509 (decision block 2243). the CRS 507 or CS 503 to which the software is being retrieved already has the PFRs 807, GFRs 811, and MFRs 815 for the packages represented by DDF 835 in an IDL 803 for the software, there is no need to update these libraries 621, and processing continues at the point marked C in FIG. 22E. Otherwise, if L/R 1135 is "C" or "N", indicating distribution to an IL 707, the IDL 803 for the packages, groups, and modules represented by the DDF 835 whose DRQR 1611 is being processed must be updated. Otherwise, distribution is to an HL 1513 and the LDL 1507 must be updated (decision block 2245). When distribution is to an HL 1513, execution continues at the point indicated by B in FIG. 22A.

When distribution is to an IL 707, the program first checks whether the IL 707 exists (block 2246), and if it does, executes loop 2248 for each PKGR 1005 in DDF 835. If it does not, execution continues at block 2211 in FIG. 22E. If an error is detected during execution of loop 2248, an error flag and an error code are set, execution of loop 2248 ceases, and execution continues at block 2211 in FIG. 22E. The steps for each PKGR 1005 are the following: first, the program gets PKGR 1005 (block 2247). Then it checks the PKGR 1005 to determine whether the values of its fields permit a PFR 807 to be made in IDL 803 for IL 707 (decision block 2249). If the values do not so permit, an error flag and error code are set in block 2251; otherwise, the program checks whether there is already a PFR 807 corresponding to the PKGR 1005 in IDL 803. The PFR 807 is located using PKNAME 1105 and PKRELNO 1107 from PKGR 1005 as keys in PF 805. If there is a corresponding PFR 807, and CONFR 1131 in DDHDR 1003 has the value "S", indicating that the package is to be skipped, (block 2255), the error flag and error code are set (block 2257). Otherwise, the program deletes the PFR B07 corresponding to PKGR 1005 and all GFRs 811 and MFRs 815 corresponding to the GRPRs 1007 and MPRs 1009 for the package in DDF 835, thus clearing PKGR 1005. GFRs 811, and MFRs 815 for the package being retrieved from IDL 803 (block 2259). Loop 2248 continues executing in the manner just described until all PKGRs 1005 in DDF 835 have been similarly processed or until an error has been found.

When the retrieval is to an HL 1513, execution continues at point B in FIG. 22A. Processing is more complex in this case because. as already pointed out, the actions taken depend on whether HL 1513 already contains both test and production packages with the same name, whether it contains only one or the other, and whether the packages already there are installed or removed.

The first step when retrieval is to an HL 1513 is decision block 2263, which checks whether the HL 1513 exists. If it doesn't, the error flag and error code are set (block 2265). If it does, the program enters a loop 2266 which processes each PKGR 1005 in DDF 835. The loop has the following steps: first, the next PKGR 1005 is read (block 2267); then the PKGR 1005 is examined to determine whether the values to which its fields are set permit loading of information from PKGR 1005 into a PFR in 807 in LDL 1507 (decision block 2269). If they do not, the error flag and error code are set (block 2271); otherwise, processing continues at point E in FIG. 22B.

The next stage of processing of PKGR 1005 is to deal with any package in LDL 1507 which has the same name as the package represented by PKGR 1005. The possible cases are the following: there is a test package which has the same name, there is a production package which has the same name, and there is a production-test package pair which has the same name. If there is only one package with the same name, that package may be installed or removed; if there is a pair, one will be installed and the other removed.

In FIG. 22B, the program first checks whether there is a PFR 807 corresponding to the PKGR 1005 currently being processed which represents a production package; if there is, it will be processed as described in FIG. 22C (block 2283); if an error arises during processing, EFL will have been set and decision block 2285 will transfer control to block 2211 in FIG. 22E. Next, the program checks whether there is a corresponding PFR 807 representing a test package; if there is, it will be processed as described in FIG. 22D (block 2287); if an error arises during processing, EFL will again have been set and decision block 2289 will transfer control to block 2211. If all PKGRs 1005 in DDF 835 being processed have been examined, decision block 2291 transfers control to block 2211; otherwise, loop 2286 is iterated.

Continuing with the detail of check production packages block 2283 in FIG. 22C. in block 2283, the program first checks whether the package represented by the corresponding PFR 807 is a production package; if it is not, no further processing is done in block 2283 (block 2293; if it is, the program checks in block 2295 whether it is installed in RL 1517; if it is, again, no further processing is done in block 2283; if it is not, the program checks in block 2297 whether CONFR 1131 in DDF 835 being processed is set to "S", indicating skip. If it is, EC and EFL are set (block 2299) and no further processing is done in block 2283. Next, the program checks whether CONFR 1131 is set to "R", indicating that the package represented by PKGR 1005 will become a test package in LDL 1507 and that in consequence, a production package may be unloaded or a test package swapped (block 22101) and, if the test package is a member of a pair, a production package may also be unloaded. If CONFR 1131 is not set to "R", no further processing is done in block 2283.

Since the production package may be a member of a test package-production package pair, the next step is to check and process the test package member of the pair, block 22103. The processing in that block is identical with that in block 2287 and is shown in FIG. 22D. If an error occurred in the processing for block 22103, EFL will be set, and block 22105 transfers control out of block 2283. Otherwise, block 22107 tests whether a swap was done in block 22103. If it was, control goes to block 2285; otherwise, the package represented by PFR 807 corresponding to PKGR 1005 currently being processed is unloaded and control then leaves block 2283.

Continuing with FIG. 22D, showing check test packages blocks 2287 and 22103, processing in those blocks proceeds in the following fashion. First, the package whose PFR 807 corresponds to PKGR 1005 being processed is checked to determine whether it is a test package (block 22111). If it is not, no further processing is done in block 2287 or 22103. If it is, the package is checked to determine whether it is installed (block 22113). If it is not, the package is unloaded from IL 707 and IDL 803 (block 22115) and processing in blocks 2287 and 22103 ends; if it is, CONFR 1131 is examined, and if it is set to "S", EFL and EC are set and processing in blocks 2287 and 22103 ends (blocks 22117 and 22119). If CONFR 1131 is set to "R", the fact that the corresponding package is installed means that it must be swapped, so that the package represented by PKGR 1005 becomes the new test package and the package represented by PFR 807 becomes the production package (blocks 22121 and 22123).

Continuing with the point C in FIG. 22E, the first step is decision block 2211, which checks whether an error occurred in any of the processing involved in setting up LDL 1507 for the package being retrieved. If the flag is set, STATUS 1717 and QUEUE 1715 are set to indicate an error during retrieval (block 2213) and processing continues with block 2131 of FIG. 21A. If L/R="C". indicating a distribution from media to IL 707 or "M", indicating a distribution from media to HL 1513, the program checks to make sure that the files specified in DDF 835 are in fact available (blocks 2215, 2217, 2219, 2221). Processing continues in this case with decision block 2227 (FIG. 22E).

If L/R is not equal to "C" or "M", a loop 2224 is executed which initiates the transactions by which the files containing the modules for the packages specified in DDF 835 are retrieved via network 615 as specified by the values of SID field 1137, OID field 1139, and RID field 1141 in DDHDR 1003 (blocks 2223, 2225). If an error has occurred during the check for files received via media or during the initiation of the retrieval, the error flag is set. The flag is checked in decision block 2227, and if there is an error, STATUS 1717 and QUEUE 1715 are set to indicate an error during the retrieve operation. Otherwise, STATUS 1717 and QUEUE 1715 are set to indicate the RA state.

16. Detail of RC Processing 2117: FIG. 23

As previously mentioned, the RC state is entered only if the processing in RT Processing 2113 is terminated in an unexpected fashion. Examples of such termination are failure of the system the program is operating on and termination of the background process executing SDSRETR 1601. When SDSRETR 1601 resumes execution in such a case, execution of decision block 2115 transfers control to block 2117. The processing in that block depends on the setting of CONFR field 1131 in DDHDR 1003 represented by the DRQR 1611. As previously mentioned, the settings of that field determines actions taken by SDSRETR 1601 in response to certain kinds of errors occurring during retrieval. In the present situation, if CONFR 1131 has the value "S", indicating skip, the RT processing done in block 2113 is simply repeated for the DRQR 1611. If there is no failure during the RT processing, the DRQR 1611 will be in a state other than RC at the end of processing (blocks 2301, 2302). If CONFR 1131 has any other value, QUEUE 1715 and STATUS 1717 are set to indicate the RE state and COMPLETE IND 1751 is set to indicate CMPT, thus terminating processing of that DRQR 1611.

17. Detail of RA Processing 2121: FIG. 24

RA processing 2121 for a given DRQR 1611 takes place only after all module files in the packages represented by a given DDF 835 have arrived in the system 601 containing the HL 1513 or IL 707 in which the modules will be stored. As shown in the flowchart of FIG. 24, RA processing 2121 adds records for the packages, groups, and modules represented by DDF 835 to LDL 1507 if the destination is HL 1513 or to IDL 803 if the destination is IL 707 and then places the retrieved module files represented by DDF 835 into HL 1513 or IL 707. Placing a retrieved module file into HL 1513 or IL 707 includes making a file 623 identified by a unique identifier in HL 1513 or IL 707, making an entry for the file in ID file 829, copying the retrieved file into the file identified by the unique identifier, giving it the same kind of protection as the retrieved file had in IL 707 from which it was retrieved, and deleting the retrieved file.

The first step executed by the program is to set QUEUE 1715 and STATUS 1717 in DRQR 1611 to indicate PA (block 2401). Then, loop 2408 is executed for each PKGR 1005 in DDF 835. On each iteration, the contents of one PKGR 1005 are copied to a PFR 807 for the package represented by PKGR 1005 in IDL 803 or LDL 1507 (blocks 2411, 2412). The GRPRs 1007 and MDRs 1009 are copied in the same fashion. In loop 2414, the contents of each GRPR 1007 belonging to the package represented by the PKGR 1005 is copied to a GFR 811 in the IDL 803 or LDL 1507 in question (blocks 2413, 2415). In loop 2416, the contents of each MDR 1009 belonging to the package is copied to a MFR 815 in the IDL 803 or LDL 1507 (block 2417). Next, an ID for the module is created, an entry relating the module name to the ID is made in ID file 829 for the IL 707 or HL 1513, and a file 623 is created which has the ID as a name (block 2419). Finally, the module file, which was loaded into IL 707 or HL 1513 from NET 615, media, or IL 707, is copied to the file having the ID created for the module (block 2421) and the protection information for that file is set from PROTD 943 in MFR 815 corresponding to the file. The loop terminates when all MDRs 1009 belonging to the package currently being processed in loop 2408 have been processed (block 2423)

Because each PKGR 1005 was copied from a PFR 807 in IDL 803 and the PFR 807 in LDL 1507 from PKGR 1005 and the same is the case for each GFR 811 and MFR 815 in LDL 1507, the records for a package in LDL 1507 differ from the records for the same package in IDL 803 only in the following respects:

file info fields 935 in MFR 815 specify a file in RL 1517 or HL 1513 instead of a file in IL 707.
production/test fields 903, 913, 925 may now specify either production or test, depending on the status of the package in LDL 1507.
installed status fields 912, 922, and 945 may now specify either installed or removed, depending on the status of the package in LDL 1507.

If an error occurred in execution of loop 2408, an error flag was set. At decision block 2427, if the error flag is set, STATUS 1717 and QUEUE 1715 are set to indicate that an error occurred during the processing of the package (block 2431); otherwise, they are set to the IT status, indicating that the software loaded into HL 1513 can be installed in RL 1517 at the time specified in INST DATE 1125 and INST TOD 1127 fields in DDHDR 1003 of DDF 835 (block 2429). Finally, the transferred module files from which the files 623 identified by the IDs were copied are deleted, leaving only the files 623 identified by the IDs in IL 707 or HL 1513 (block 2433).

Whenever a MDR 1009 is copied to an MFR 815, a GRPR 1007 to a GFR 811, or a PKGR 1005 to a PFR 807, the checksum for the module, group, or package represented by the record in DDF 835 is again calculated in the manner previously described. The newly-calculated value is compared with the checksum contained in MFRCS 942 of the MDR 1009, GRPRCS 920 of the GRPR 1007, or PFRCS 910 of PKGR 1005. If they are not the same, an error has occurred during transfer of the files 623 for the modules and an error code and error message are generated.

18. Detail of INSTALL Processing 2125: FIG. 25

Install processing 2125 installs the module files loaded into HL 1513 into RL 1517, where they are available for execution. The processing is performed when DRQR 1611 being processed is in the IT state and the time has arrived for installation (see block 2013 in FIG. 20) or when installation has begun, putting DRQR 1611 into the IA state, but has not yet been finished. Thus, install processing block 2125 may be reached from either decision block 2123 or decision block 2127.

FIG. 25 is a flowchart of the processing in block 2125. First, QUEUE 1715 and STATUS 1717 are put into the IA state (block 2501). Next, loop 2503 is executed for each package in DDF 835. First, as shown in block 2505, PKGR 1005 for the package is fetched from DDF 835. Then, the corresponding PFR 807 for the package is obtained from LDL 1507. Thereupon, the package is installed. As previously described, if there is no other package with the same name as the one represented by the corresponding PFR 807, the files 623 representing the modules in the package are simply renamed to place them in RL 1517; if the package being installed is one of a production package-test package pair, the member of the pair which is currently installed is first renamed to remove it to HL 1513 and the other member is then renamed to place it in RL 1517. Upon installation, the records for the package in LDL 1507 are marked to indicate that the package is installed. Once installed in RL 1517, the software may be executed by users of systems having access to RL 1517. Loop 2503 is repeated until all PKGRs 1005 in DDF 835 have been processed (decision block 2511). If an error arises during execution of loop 2503, an error flag is set. As shown in decision block 2513, if there were no errors, STATUS 1717 and QUEUE 1715 are set to indicate the IC status and COMPLETE IND field 1751 is set to indicate that the retrieval and installation are complete (block 2517). If there are errors, an error flag and error code are set (block 2515).

19. Conclusion

The foregoing disclosure has shown how a novel data distribution apparatus may be constructed in a digital computer system and how the data distribution apparatus may be used to distribute data across a network or by means of media. The data to be distributed is described in a data descriptor which is produced by a central system and provided to a remote system. The remote system then uses the information in the data descriptor to retrieve the described data and install it in the remote system.

The disclosure has included a detailed description of an implementation of the data distribution apparatus in a distributed system made up of VS computer systems manufactured by Wang Laboratories. Inc. In this implementation, the data distribution apparatus is used to distribute software from a central system to a remote system. The software to be distributed is stored in an inventory library accessible to the central system and information concerning the contents of the inventory library is stored in an inventory directory library in the central system. Distributed software is stored in a holding library and a run library in the remote system. The holding library contains software which is not currently available for execution, and the run library contains software which is currently available for execution. Information concerning the contents of the holding library and the run library is contained in a live directory library in the remote system.

The preferred embodiment disclosed herein operates as follows: programs executing on the central system use information obtained interactively from a user of the central system and from the inventory library to make a data descriptor file describing the software to be distributed to the remote systems. The data descriptor file is sent via any file transfer means including media to the remote systems. The remote systems automatically receive the data descriptor file and employ the information in the data descriptor file to retrieve the software from the inventory library specified in the data descriptor file. The retrieved software is placed in the holding library and information concerning the retrieved software is added to the live directory library. If the data descriptor file so specified, the retrieved software is automatically installed by copying it into the run library; otherwise, it is retained in the holding library for later manual installation.

As disclosed herein, the data distribution apparatus may be used to distribute an entire software package or only some of the modules of a software package. In the latter case, modules which are not part of the new distribution are retained in the holding library, modules which have the same names as those in the new distribution are replaced by the newly-distributed ones, and any new modules are added to the holding library. Further, a software package may be retrieved at a specific time and automatically installed at another time or installed manually.

As further disclosed herein, the data distribution apparatus may be used to distribute software packages by means of a network or by means of media. The network used for distribution need only have a general file transfer capability. Moreover, there need be no hierarchy among the components of a distributed system in which the apparatus is used. A given component system may be a central system, a remote system, or both a central and a remote system. The apparatus disclosed herein is thus both simpler and more flexible than data distribution apparatus of the prior art.

As will be clear to those skilled in the art, certain characteristics of the preferred embodiment disclosed herein are a consequence of the fact that the preferred embodiment was implemented on VS systems using programs whose source code was written in the COBOL language. The invention disclosed herein is in no way dependent on particular characteristics of the VS systems or of the COBOL language and may be implemented on any computer system using programs written in any source language. In particular, the invention is not limited to data descriptors which are files or to distribution of data contained in files. Further, in implementations on computer systems having file systems different from those of the VS systems, the libraries may be implemented as directories and the modules belonging to a package may be contained in subdirectories in the library directories. Additionally, in computer systems having systems providing for interprocess communication and interrupts, retrieval of software may be interrupt driven.

As will also be clear to those skilled in the art, implementations of the invention other than the one described herein are possible. Details of the described implementation such as the detailed contents of the data descriptor, the values of certain variables, or the order in which certain operations are performed, are intended to be purely exemplary. Thus, the embodiment described herein is to be considered in all respects as illustrative and not restrictive, the scope of the invention being indicated by the appended claims rather than the foregoing description, and all changes which come within the meaning and range of equivalency of the claims are intended to be embraced therein.

What is claimed is:

1. Data distribution apparatus used in a digital computer system, the digital computer system including one or more processors, to distribute data within the digital computer system and the data distribution apparatus comprising:
(1) a source for data to be distributed, the source being in the digital computer system but not in a physical address space of any of the processors;
(2) system data distribution means which operates in a processor in the digital computer system for creating a system data descriptor describing at least a location in the source of the data to be distributed, the system data descriptor further having information expressive of a first time value for indicating when the data is to be distributed;
(3) a destination for the data to be distributed, the destination being in the digital computer system but not in the physical address space of any of the processors; and
(4) system retrieval means which operates in a processor in the digital computer system and which is coupled to and has access to the source to copy data stored in the source and which is also coupled to the destination to store data in the destination, the system retrieval means including means for receiving the system data descriptor from the system data distribution means and further including means for automatically responding thereto by transferrng the data to be distributed from the source to the destination at a time corresponding to the first time value expressed by the system data descriptor.

2. In the apparatus of claim 1 and wherein:
the apparatus includes a plurality of sources;
the system data descriptor specifies a specified one of the plurality of sources; and
the system retrieval means is coupled to and transfers the data to be distributed from the specified source to the destination.

3. In the apparatus of claim 1 and wherein:

the system data descriptor further includes a destination operation descriptor describing operations to be performed at the destination on the data to be distributed; and the system retrieval means further includes means for responding to the system data descriptor by performing operations on the data as specified in the destination operation descriptor.

4. In the apparatus of claim 3 and wherein:

the destination includes a first library for receiving the data to be distributed from the source and holding the data to be distributed in the destination until the data is installed for use in the destination and a second library for holding the data to be distributed when installed; and the system retrieval means is coupled to the first library and includes means for transferring the data to be distributed from the source to the first library.

5. In the apparatus of claim 4 and wherein:

the destination operation descriptor further specifies a second time value for indicating when the data to be distributed is to be transferred from the first library to the second library and wherein the system retrieval means transfers the data from the first library to the second library no earlier than a time specified by the second time value.

6. In the apparatus of claim 4 and wherein:

the first time value of the destination operation descriptor specifies a time when the data to be distributed is to be transferred from the source to the first library and the transferring means of the system retrieval means is responsive to the first time value for transferring the data no earlier than the time specified by the first time value.

7. In the apparatus of claim 3 and wherein:

the destination contains previously-distributed data;

certain of the data to be distributed is conflicting data which conflicts with the previously-distributed data;

the previously-distributed data and the data to be distributed each include information from which it may be determined whether the conflicting data is present;

the destination operation descriptor includes a conflict resolution value specifying how conflicts between the previously-distributed data and the data to be distributed are to be resolved; and the system retrieval means further includes means for detecting whether the conflicting data is present and for responding thereto as specified by the conflict resolution value.

8. In the apparatus claim 1 and wherein:

the data to be distributed is stored in a first module in the source;

protection information for the first module is further accessible in the source;

the system data descriptor includes protection descriptor information expressive of the protection information for the first module; and the system retrieval means further includes means for responding to the protection descriptor information of the system data descriptor by copying the data to be distributed into a second module in the destination, the system retrieval means further including means for generating protection information for the second module which is identical to the protection descriptor information and which is accessible in the destination.

9. In the apparatus of claim 1 and wherein:

the digital computer system includes media reading means and media writing means;

the source comprises media means whereupon the system data distribution means has employed the media writing means to write the system data descriptor and the data to be distributed; and the system retrieval means employs the media reading means to read the system data descriptor from the media means and responds thereto by employing the media reading means to read the data to be distributed from the media means and transferring the data to be distributed from the media means to the destination.

10. In the apparatus of claim 9 and wherein:

the digital computer system includes a central computer system including the media writing means and a remote computer system including the media reading means;

the system data distribution means operates in a processor in the central computer system; and the system retrieval means operates in a processor in the remote computer system and the destination is accessible therefrom.

11. In the apparatus of claim 1 and wherein:

the source is remote from the destination and is coupled thereto by data transfer means for transferring data between the source and the destination; and the automatic responding means of the system retrieval means is coupled to the data transfer means and responds to the system data descriptor by employing the data transfer means to transfer the data to be distributed from the source to the destination.

12. In the apparatus of claim 11 and wherein:

the system data descriptor includes an estimated transfer time value and the system retrieval means includes means responsive to the estimated transfer time value for indicating an error when an actual time required to transfer the data from the source to the destination exceeds the estimated transfer time value.

13. In the apparatus of claim 11 and wherein:

the digital computer system includes a central computer system and a remote computer system coupled together by the data transfer means;

the system data distribution means operates in a first processor in the central computer system and the source is accessible from the first processor;

the system data distribution means is coupled to and employs the data transfer means to transfer the system data descriptor from the central computer system to the remote computer system; and the system retrieval means operates in a second processor in the remote computer system and the destination is accessible from the second processor; and the system retrieval means receives the system data descriptor from the data transfer means.

14. In the apparatus of claim 11 and wherein:

the digital computer system includes a host computer system, a central computer system, and a remote computer system coupled together by the data transfer means;

the source is accessible from both the host computer system and from the remote computer system;

the system data distribution means operates in a processor in the central computer system;

the system retrieval means operates in a processor in the remote computer system and the destination is accessible form the remote computer system; and the system retrieval means receives the system data descriptor via the data transfer means from the system data distribution means and transfers the data to be distributed from the host computer system to the remote computer system by way of the data transfer means.

15. In the apparatus of claim 1 and wherein:
the digital computer system includes a plurality of component digital computer systems;
wherein any of the component digital computer systems is optionally a central system including processor means upon which the system data distribution means operates; and wherein
any of the component digital computer systems is optionally a remote system which includes processor means upon which the system retrieval means operates and which has access to the source and to the destination.

16. In the apparatus of claim 15 and wherein:
any of the component systems is optionally both a central system and a remote system.

17. In the apparatus of claim 15 and wherein:
certain of the component digital computer systems are coupled together by data transfer means;
any central system optionally includes media writing means for writing information on media means;
any remote system optionally includes media reading means for reading information from the media means;
the source includes storage means accessible to the data transfer means and the media writing means;
the system data distribution means is coupled to the media writing means for writing the system data descriptor and the data to be distributed on the media means and is also coupled to the data transfer means for sending the system data descriptor via the data distribution means; and
the system retrieval means is coupled to the media reading means for reading the system data descriptor from the media means and is responsive thereto for employing the media reading means to read the data to be distributed and transferring the data to be distributed to the destination and is also coupled to the data transfer means for receiving the system data descriptor from the data transfer means and is responsive thereto for employing the data transfer means to transfer the data to be distributed from the storage means to the destination.

18. In the apparatus of claim 16 and wherein:
certain of the component digital computer systems are connected by data transfer means;
any central system optionally includes media writing means for writing on media means;
any remote system optionally includes media reading means for reading from the media means;
the source includes storage means accessible to the data transfer means and the media writing means;
the system data distribution means alternatively employs the media writing means to write the system data descriptor and the data to be distributed to the media means and employs the data transfer means to send the system data descriptor via the data distribution means; and
the system retrieval means alternatively employs the media reading means to read the system data descriptor from the media means and respond thereto by employing the median reading means to read the data to be distributed and transferring the data to be distributed to the destination and receives the system data descriptor from the data transfer means and responds thereto by employing the data transfer means to transfer the data to be distributed from the storage means to the destination.

19. In the apparatus of claim 1 and wherein:
the data to be distributed is software executable in a processor in the digital computer system and
the destination comprises storage means for software to be executed in the processor, and wherein the system retrieval means further includes means for storing the executable software in the storage means.

20. A method for distributing data in a digital computer system which includes one or more processors, the data being distributed from a source which is within the digital computer system but not in a physical address space of any of the processors to a destination which is within the digital computer system but not in the physical address space of any of the processors, the method comprising the steps of:
employing system data distribution means operating in a processor of the digital computer system for making a system data descriptor for specifying a location in the source of the data to be distributed and further for specifying a time at which the data is to be distributed;
providing the system data descriptor to system data retrieval means operating in a processor in the digital computer system, the system data retrieval means having access to the source and to the destination;
interpreting the system data descriptor with the system data retrieval means;
retrieving, with the system data retrieval means, from the specified location and at a time not prior to the specified time, the data stored therein; and
automatically transferring with the system data distribution means the data to be distributed from the source to the destination.

21. In the method of claim 20 and wherein:
the system data retrieval means and the system data distribution means are each coupled to network means; and wherein
the step of providing includes a step of transmitting the system data descriptor over the network means.

22. In the method of claim 21 and wherein:
the source is coupled to the network means; and wherein
the step of automatically transferring includes a step of transmitting the data to be distributed over the network means.

23. In the method of claim 20 and wherein:
the step of making includes a stop of writing the system data descriptor onto media means;
the system data descriptor is provided on the media means; and wherein
the step of interpreting includes a step of reading the system data descriptor from the media means.

24. The method of claim 23 and wherein:
the media means upon which the system data descriptor is provided further includes the source.

25. Data distribution apparatus used in a digital computer system including one or more processors to distribute data within the digital computer system comprising:
(1) a source for data to be distributed, the source being in the digital computer system but not in a physical address space of any of the processors;
(2) a first destination for the data to be distributed where the data to be distributed is held until the data to be distributed is installed for use in the digital computer system, the first destination being in the digital computer system but not in the physical address space of any of the processors;
(3) a second destination for the data to be distributed where the data to be distributed is held when installed for use in the digital computer system, the second destination being in the digital computer system but not in the address space of any of the processors; and
(4) data transfer means operating in a processor in the digital computer system and being coupled to and having access to the source and to the first and second destinations for transferring, in response to data stored within entries of a data descriptor data structure, the data to be distributed from the source to the first destination and thereupon installing the data to be distributed by transferring the data to be distributed from the first destination to the second destination; wherein
the data transfer means automatically installs the data to be distributed no earlier than a first specified time; wherein
the data transfer means automatically transfers the data to be distributed from the source to the first destination no earlier than a second specified time; and wherein
the first specified time and the second specified time are each specified within a first entry and within a second entry, respectively, of the data descriptor data structure.

26. In the data distribution means of claim 25 and wherein:
the first destination contains a first version of the data to be distributed and the second destination contains a second version of the data to be distributed and the data transfer means includes means responsive to a third entry of the data descriptor data structure for installing the first and second versions alternatively by automatically exchanging the first and second versions between the first and second destinations whereby only one of the versions is present in the second destination at any time.

27. In a system for distributing data packages containing at least one data module to a plurality of computer systems, means in each computer system for distributing an update module replacing a module of a previously-distributed data package,
the means for distributing comprising:
(1) means coupled to a source of update modules for receiving the update module;
(2) means for automatically determining that a module of the previously-distributed data package is to be replaced by the received update module; and
(3) means for replacing the module to be replaced with the update module; and wherein the receiving means further receives a data descriptor data structure and the determining means is responsive to a first content of the data descriptor data structure for automatically determining if the module is to be replaced, and wherein the receiving means is responsive to a second content of the data descriptor data structure for receiving the update module no earlier than a time specified by the second content of the data descriptor data structure.

28. Apparatus for distributing data to a digital computer system, the apparatus for distributing data comprising:
(1) an inventory library which contains one or more modules containing data to be distributed;
(2) an inventory directory library containing a package record identifying a package consisting of at least one of the modules from the inventory library;
(3) system data distribution means coupled to the inventory directory library for creating a system data descriptor including information relating to the package record;
(4) a live library for receiving at least one of the modules from the inventory library;
(5) a live directory library containing a record identifying a package consisting of at least one of the modules from the live library; and
(6) system retrieval means coupled to the system data distribution means and also coupled to and having access to the inventory directory, the live library, and the live directory, library for receiving the system data descriptor and automatically responding thereto by using the information in the system data descriptor to retrieve at least one of the modules from the inventory library to the live library and create a record in the live directory library for the package; and wherein the system retrieval means is further responsive to the information in the system data descriptor for retrieving the at least one module no earlier than a time specified by the system data descriptor.

29. In the apparatus of claim 28 and wherein:
the apparatus further includes a run library which contains any module from the live library when the package to which the module belongs is being used;
the live directory library records for any package further indicates whether the modules belonging to that package are in the run library;
the system data descriptor further specifies whether the modules belonging to the package are to be automatically placed in the run library; and
the system retrieval means responds to the system data descriptor when the system data descriptor specifies that the modules belonging to the package are to be automatically placed in the run library by setting the live directory library record for the package to indicate that the module is in the run library and placing the modules belonging thereto in the run library.

30. In the apparatus of claim 28 and wherein:
the apparatus further includes value generation means for generating package verification values from which it may be determined whether any of the modules in the package has been modified;
the inventory directory library record includes a present package verification value;
the system data descriptor includes information expressive of the present package verification value; and
the system data distribution means copies the present package verification value into the corresponding information of the system data descriptor; and the system retrieval means employs the value generating means to generate one package verification value from the retrieved module and compares the generated package verification value with the present package verification value in the system data descriptor to determine whether the data to be distributed was modified during retrieval.

31. Apparatus for storing and using data modules in a digital computer system comprising:
  (1) a live library which contains a module when the module is not in use in the digital computer system;
  (2) a run library which contains the module when the module is in use in the digital computer system;
  (3) a live directory library which contains a record identifying the module and specifying whether the module is currently contained in the live library or the run library; and
  (4) data management means coupled to the live library, the run library and the live directory library for installing the module by placing the module in the run library and altering the record to indicate that the module is currently contained in the run library when the module is to be used in the digital computer system and removing the module by placing the module in the live library and altering the record to indicate that the module is currently contained in the live library when the module is not in use; and wherein
  the data management means is responsive to information contained in a system data descriptor data structure for installing the module at a time specified by the system data descriptor data structure.

32. In the apparatus of claim 31 and wherein:
  the modules include a pair of modules, one member of the pair being a test module and the other member of the pair being a production module;
  each member of the pair has a record in the live directory library and the record for the member specifies whether the member is a test module or a production module;
  one member of the pair is always installed and the other member is always removed; and
  the data management means installs the removed member by placing the installed member in the live library and placing the removed member in the run library and removes the installed member by placing the installed member in the live library and placing the removed member in the run library.

33. In the apparatus of claim 32 and wherein:
  the data management means further swaps an installed test module member by deleting the production module member from the live library, deleting the record for the production module member, and altering the record for the test module member to specify that the test module is now a production module.

34. In the apparatus of claim 33 and wherein:
  the data management means swaps the test module member for the production module member in response to a user of the digital computer system.

35. In the apparatus of claim 31 and wherein:
  the modules include test modules and production modules;
  the record for any module indicates whether that module is a test module or a production module; and
  the data management means makes an installed test module into a production module by changing the record for the test module to indicate that the test module is a production module.

36. In the apparatus of claim 35 and wherein:
  the data management means makes the installed test module into the production module in response to a user of the digital computer system.

* * * * *

UNITED STATES PATENT AND TRADEMARK OFFICE
CERTIFICATE OF CORRECTION

PATENT NO. : 4,974,149

DATED : November 27, 1990

INVENTOR(S) : Andrew P. Valenti

It is certified that error appears in the above-identified patent and that said Letters Patent is hereby corrected as shown below:

IN THE TITLE

Replace the present title with the following:

--DATA DISTRIBUTION APPARATUS AND METHOD HAVING A DATA DESCRIPTOR INCLUDING INFORMATION FOR SPECIFYING A TIME THAT A DATA DISTRIBUTION IS TO OCCUR--.

IN THE CLAIMS

In Claim 14, col. 33, line 3, delete "form" and insert --from--.

In Claim 15, col. 33, line 13 delete "computer" and insert --component--.

Replace Claim 18 with the following:

--18. In the apparatus of claim 1 and wherein:

the digital computer system includes a file system;

the source and destination are file storage means;

UNITED STATES PATENT AND TRADEMARK OFFICE
CERTIFICATE OF CORRECTION

PATENT NO. : 4,974,149

DATED : November 27, 1990

INVENTOR(S) : Andrew P. Valenti

It is certified that error appears in the above-identified patent and that said Letters Patent is hereby corrected as shown below:

the data to be distributed is contained in a file;

the system data descriptor is a system descriptor file describing the file containing the data to be distributed; and the system retrieval means responds to the system descriptor file by transferring the file containing the data which is described in the system descriptor file from the source to the destination.--

Claim 23, col. 34, line 58, delete "stop" and insert --step--.

Claim 25, col. 35, line 3 after "for" insert --the--.

Signed and Sealed this

Twenty-first Day of July, 1992

Attest:

DOUGLAS B. COMER

*Attesting Officer*    *Acting Commissioner of Patents and Trademarks*